United States Patent
C H et al.

(10) Patent No.: US 11,575,615 B2
(45) Date of Patent: Feb. 7, 2023

(54) FIRST NETWORK NODE, SECOND NETWORK NODE, AND METHODS PERFORMED THEREBY FOR TRACING A PACKET IN A PIPELINE

(71) Applicant: Telefonaktiebolaget LM Ericsson (publ), Stockholm (SE)

(72) Inventors: Vyshakh Krishnan C H, Karnataka (IN); Faseela K, Karnataka (IN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 171 days.

(21) Appl. No.: 17/050,978

(22) PCT Filed: May 2, 2018

(86) PCT No.: PCT/IN2018/050272
§ 371 (c)(1),
(2) Date: Oct. 27, 2020

(87) PCT Pub. No.: WO2019/211860
PCT Pub. Date: Nov. 7, 2019

(65) Prior Publication Data
US 2021/0234806 A1    Jul. 29, 2021

(51) Int. Cl.
*H04L 47/28* (2022.01)
*H04L 43/10* (2022.01)
(Continued)

(52) U.S. Cl.
CPC ............ *H04L 47/286* (2013.01); *H04L 43/10* (2013.01); *H04L 45/50* (2013.01); *H04L 47/11* (2013.01)

(58) Field of Classification Search
CPC ....... H04L 47/286; H04L 43/10; H04L 45/50; H04L 47/11; H04L 43/50; H04L 12/4625; H04L 43/20
See application file for complete search history.

(56) References Cited

U.S. PATENT DOCUMENTS 10,200,279 B1 * 2/2019 Aljaedi ................... H04L 43/20
2015/0016286 A1    1/2015 Ganichev et al.
(Continued)

FOREIGN PATENT DOCUMENTS

CN    107094090 A *  8/2017  ............ G06F 11/008
EP    3619895 A1    3/2020
(Continued)

OTHER PUBLICATIONS

Examination Report, Indian Application No. 202017043891, dated Jun. 12, 2021, 5 pages.
(Continued)

*Primary Examiner* — Donald L Mills
(74) *Attorney, Agent, or Firm* — Sage Patent Group

(57) ABSTRACT

Methods for tracing a packet in a pipeline comprising a set of tables, in an SDN using OpenFlow. The packet comprises a trace bit, and is provided with a TTL value. A first network node indicates to a second network node to have each flow table decrement the TTL value by 1, based upon the trace bit. The first network node initially sets the TTL to be 1, and then sends the packet to a first table in the second network node. The first network node receives the packet, from another table in the set, and for every remaining table, and one table at a time: a) increments the TTL value by 1, and b) repeats the sending, and the receiving, until a last table is reached or a criterion is met. The first network node then indicates a route followed by the packet.

13 Claims, 11 Drawing Sheets

(51) Int. Cl.
*H04L 45/50* (2022.01)
*H04L 47/11* (2022.01)

(56) References Cited

U.S. PATENT DOCUMENTS

| | | | | |
|---|---|---|---|---|
| 2015/0271084 A1* | 9/2015 | Nakakes | ................ | H04L 45/26 |
| | | | | 370/392 |
| 2016/0380874 A1* | 12/2016 | Sun | ........................ | H04L 45/64 |
| | | | | 370/254 |
| 2018/0337839 A1* | 11/2018 | Bristow | ................. | H04L 43/06 |

FOREIGN PATENT DOCUMENTS

| | | |
|---|---|---|
| EP | 3677000 A1 | 7/2020 |
| EP | 3701687 A1 | 9/2020 |
| WO | 2018046988 A1 | 3/2018 |

OTHER PUBLICATIONS

International Search Report and Written Opinion of the International Searching Authority for PCT International Application No. PCT/IN2018/050272 dated Sep. 26, 2018.
Open Networking Foundation, "OpenFlow Switch Specification, Version 1.5.0 (Protocol version 0x06)," Dec. 19, 2014, 277 pages.
Extended European Search Report and Opinion, 18917354.5, dated Nov. 15, 2021 9 pages.

* cited by examiner a)

b)

FIRST NETWORK NODE, SECOND NETWORK NODE, AND METHODS PERFORMED THEREBY FOR TRACING A PACKET IN A PIPELINE

CROSS REFERENCE TO RELATED APPLICATION

This application is a 35 U.S.C. § 371 national stage application of PCT International Application No. PCT/IN2018/050272 filed on May 2, 2018, the disclosure and content of which is incorporated by reference herein in its entirety.

TECHNICAL FIELD

The present disclosure relates generally to a first network node and methods performed thereby for tracing a packet in a pipeline. The present disclosure also relates generally to a second network node, and methods performed thereby for tracing the packet in the pipeline. The present disclosure further relates generally to a computer program product, comprising instructions to carry out the actions described herein, as performed by the first network node, or the second network node. The computer program product may be stored on a computer-readable storage medium.

BACKGROUND

Computer systems in a network may comprise one or more network nodes. A network node may comprise one or more processors which, together with computer program code may perform different functions and actions, a memory, a receiving and a sending port. Network nodes may be comprised in a network, such as a Software-Defined Network (SDN).
Software-Defined Networks
An SDN may be understood as a platform that enables control of an underlying computer network infrastructure, which may include a telecommunications network, and which may often be diverse, comprising multiple switches controlled by a single central entity called SDN controller. SDNs may be understood to facilitate rapid and open innovation at the network layer by providing a programmable network infrastructure. SDN enables to address any changing needs an application, e.g., a business application may have, by providing a programmable centralized control, which may be carried out by a network node known as a controller. The controller in the SDN network may be understood to manage network traffic, and relay information to switches and routers based on the needs an application may have. The application may be run by the controller or may configure the controller. Based on the configuration, the controller may then program the switches. The network traffic may be understood to comprise packets. The SDN may be used in data centers, where packets may be received from Virtual Machines (VMs) hosting a particular type of application, and which in turn may be communicating with other VMs, or other nodes or destinations. A packet may be understood as a series of bytes comprising a header, a payload and optionally a trailer, in that order, and treated as a unit for purposes of processing and forwarding. A packet may be e.g., an Ethernet packet.

In the production SDN based network, dynamic programming of flow control policies may be enabled by an innovative standard, the OpenFlow switching specification, such as that described in https://www.opennetworking.org/images/stories/downloads/sdn-resources/onf-specifications/openflow/openflow-switch-v1.5.0.noipr.pdf.

An OpenFlow Logical Switch, which may be referred to herein simply as a switch, may be understood as a set of OpenFlow resources that may be managed as an entity. Every OpenFlow Logical Switch may be understood to comprise a packet processing pipeline, which may also be simply referred to as a pipeline, containing one or more so-called flow tables. A flow table may be understood as a stage of the pipeline. Each flow table may contain one or more flow entries, where each flow entry may contain match-and-action instructions. According to these instructions, an incoming packet may be checked for a match between one or more match fields in a flow entry and one or more values in a set of fields in the packet, e.g., in a header of the packet. If a match is found, the action instructions may be performed. For example, the packet may be forwarded to another flow table. The pipeline may also comprise one or more group tables. A group table, which may be referred to simply as a group, may be understood as a list of actions, so called action buckets, and some means of choosing one or more of those buckets to apply on a per-packet basis Therefore, in another example, if a match is found, the packet may be forwarded to a group table, and processed accordingly.

The flow tables of an OpenFlow switch may be understood to be numbered in an order they may be traversed by packets, starting at 0, and in ascending order. The order of the flow tables may be understood to be determined on a packet by packet basis, based on one or more requirements of the application the particular packet is related to. The processing of the packet in the pipeline may result in the packet being forwarded to its intended destination device. Pipeline processing may be understood to always start at the first flow table. That is, the packet may first be matched against flow entries of flow table 0. Other flow tables may be used depending on the outcome of the match, and corresponding action, in each table traversed. The resulting order of flow tables and or group tables that may be followed by the packet in the pipeline may be understood as a trace, which may be referred to herein as a route.

Pipelines may be large and complex. When a packet does not go through its intended packet processing path, then troubleshooting may be required to identify the error or errors in the route. This results in a difficult and time consuming troubleshooting process which in turn results in increased latencies, errors, and wasted resources in the network.

SUMMARY

It is an object of embodiments herein to improve the monitoring of the functioning of a communications network. It is a particular object of embodiments herein to improve the tracing of a packet in a pipeline in an SDN using Openflow.

According to a first aspect of embodiments herein, the object is achieved by a method performed by a first network node. The method is for tracing a packet in a pipeline. The pipeline is comprised in a second network node. The pipeline comprises a set of flow tables. The first network node and the second network node operate in a software defined network using OpenFlow. The first network node sends a first indication to the second network node that is to receive the packet. The packet comprises a trace bit, and the packet is to be provided with a Time To Live (TTL) value. The first indication indicates to have each flow table comprised in the set of flow tables decrement the TTL value by 1, based upon detection of the trace bit. The first network node sets an initial value of the TTL value in the packet to be equal to 1. The first network node then sends the packet comprising the trace bit and the TTL value to the second network node. The packet is provided to a first flow table, e.g., table 0, comprised in the set of flow tables. The set of flow tables has been set to process the packet in an order. The first network node receives the packet, from another flow table in the set of flow tables, with the TTL value of 0, and for every remaining flow table in the set of flow tables, and for as long as there is at least one remaining flow table in the set of flow tables, following the order of the flow tables in the set of flow tables, and one flow table at a time, the first network node: a) increments the TTL value by 1, and b) repeats the sending of the packet, and the receiving of the packet, until one of: i) a last flow table in the set of flow tables is reached and ii) a criterion is met. The first network node then initiates sending, to a third network node, a second indication of a route followed by the packet in the pipeline, based on one of: iii) the packet having been received from all the flow tables in the set of flow tables, and iv) the criterion having been met.

According to a second aspect of embodiments herein, the object is achieved by a method performed by the second network node. The method is for tracing the packet in the pipeline. The pipeline is comprised in the second network node. The pipeline comprises a set of flow tables. The second network node operates in the software defined network using OpenFlow. The second network node receives the first indication from the first network node that is to send the packet. The packet is to comprise the trace bit, and the packet is to be provided with the TTL value. The first indication indicates to have each flow table comprised in the set of flow tables decrement the TTL value by 1 based upon detection of the trace bit. The second network node then receives the packet comprising the trace bit and the TTL value from the first network node. The packet is provided to the first flow table comprised in the set of flow tables. The set of flow tables has been set to process the packet in the order. The second network node processes the packet according to the received first indication. The processing further comprises: i) sending the packet to the first network node once the TTL value is decreased to 0, and ii) sending the packet to a next flow table in the set of flow tables, once the TTL value is decreased to a resulting value different than 0. The second network node sends the packet from another flow table in the set of flow tables to the first network node once the TTL value is decreased to 0. The first time the packet is received, the TTL value provided with packet is equal to 1. For every remaining flow table in the set of flow tables, and for as long as there is at least one remaining flow table in the set of flow tables, following the order of the flow tables in the set of flow tables, and one flow table at a time, the second network node repeats the receiving of the packet, with the TTL value incremented by 1, the processing, and the sending of the packet, until one of: i) the last flow table in the set of flow tables is reached, and ii) the criterion is met.

According to a third aspect of embodiments herein, the object is achieved by the first network node, configured to trace the packet in the pipeline. The pipeline is configured to be comprised in the second network node. The pipeline is further configured to comprise the set of flow tables. The first network node and the second network node are configured to operate in the software defined network using OpenFlow. The first network node is further configured to send the first indication to the second network node that is to receive the packet. The packet is configured to comprise the trace bit. The packet is further configured to be provided with the TTL value. The first indication is configured to indicate to have each flow table comprised in the set of flow tables decrement the TTL value by 1, based upon detection of the trace bit. The first network node is further configured to set the initial value of the TTL value in the packet to be equal to 1. The first network node is also configured to send the packet configured to comprise the trace bit and the TTL value to the second network node. The packet is configured to be provided to the first flow table configured to be comprised in the set of flow tables. The set of flow tables has been configured to process the packet in the order. The first network node is further configured to receive the packet, from another flow table in the set of flow tables, with the TTL value of 0, and for every remaining flow table in the set of flow tables, and for as long as there is at least one remaining flow table in the set of flow tables, following the order of the flow tables in the set of flow tables, and one flow table at a time, the first network node is further configured to a) increment the TTL value by 1, and b) repeat the sending of the packet, and the receiving of the packet, until one of: i) the last flow table in the set of flow tables is reached, and ii) the criterion is met. The first network node is further configured to initiate sending, to the third network node, the second indication of the route followed by the packet in the pipeline, based on one of: iii) the packet having been received from all the flow tables in the set of flow tables, and iv) the criterion having been met.

According to a fourth aspect of embodiments herein, the object is achieved by the second network node, configured to trace the packet in the pipeline. The pipeline is configured to be comprised in the second network node. The pipeline is further configured to comprise the set of flow tables. The second network node is further configured to operate in the software defined network using OpenFlow. The second network node is further configured to receive the first indication from the first network node, that is to send the packet. The packet is configured to comprise the trace bit. The packet is configured to be provided with the TTL, value. The first indication is configured to indicate to have each flow table comprised in the set of flow tables decrement the TTL value by 1 based upon detection of the trace bit. The second network node is also configured to receive the packet configured to comprise the trace bit and the TTL value from the first network node. The packet is configured to be provided to the first flow table configured to be comprised in the set of flow tables. The set of flow tables have been configured to process the packet in the order. The second network node is further configured to process the packet according to the first indication configured to be received. To process is further configured to comprise to: i) send the packet to the first network node 101 once the TTL value is decreased to 0, and ii) send the packet to the next flow table in the set of flow tables, once the TTL value is decreased to a resulting value different than 0. The second network node is further configured to send the packet from another flow table in the set of flow tables to the first network node once the TTL value is decreased to 0. The first time the packet is configured to be received, the TTL value is configured to be provided with packet is equal to 1. For every remaining flow table in the set of flow tables, and for as long as there is at least one remaining flow table in the set of flow tables, following the order of the flow tables in the set of flow tables, and one flow table at a time, the second network node is further configured to repeat the receiving of the packet, with the TTL value incremented by 1, the processing and the sending of the packet, until one of: i) the last flow table in the set of flow tables is reached, and ii) the criterion is met.

By the first network node sending the first indication to the second network node, setting the initial value of the TTL to be equal to 1, and then sending the packet comprising the trace bit and the TTL value to the second network node, and, one flow table at a time, incrementing the TTL value by 1, and repeating, the sending, and the receiving of the packet, until a last flow table in the set of flow tables is reached, the first network node is enabled to trace, in a stepwise fashion, flow table by flow table, the route followed by the packet in the pipeline. The first network node is also enabled to initiate sending the second indication to the third network node, which upon receipt of the second indication, may determine, in comparison with the set of flow tables it may have set for the packet, which flow table is causing the processing error, or packet drop, in the pipeline.

Similarly, by receiving the first indication from the first network node, the second network node is enabled to process the packet, in a stepwise fashion, flow table by flow table, enabling to indicate to the first network node, the route followed by the packet in the pipeline, and which flow table may be causing the processing error, or packet drop, in the pipeline.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

Figure 1:
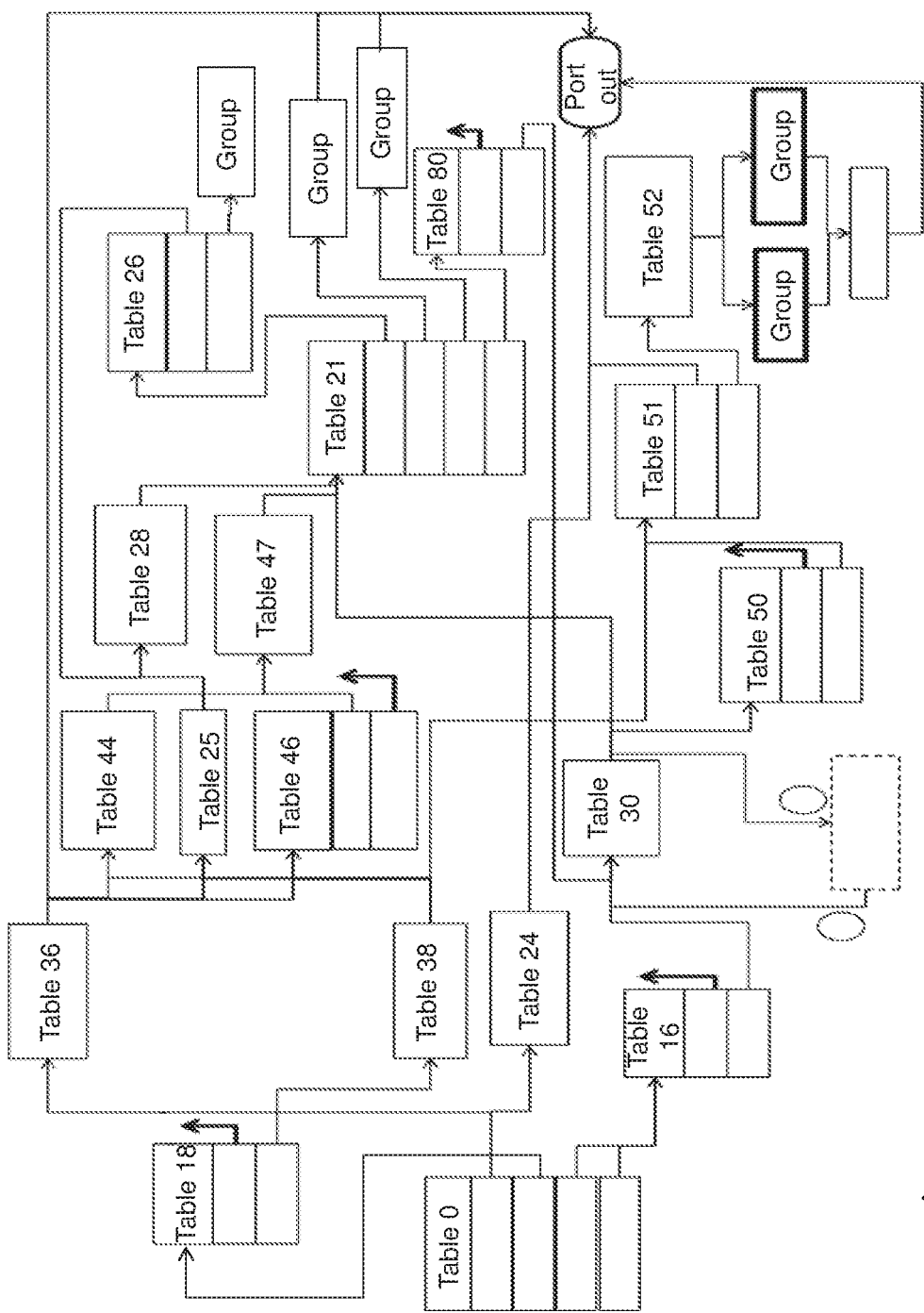
FIG. 1 is a schematic diagram illustrating an example of a pipeline.

The problem with the OpenFlow model is that the packet processing pipeline is becoming increasingly complex. FIG. 1 is a schematic illustration of an example of a packet processing pipeline that may be used by a Cloud SDN Controller (CSC). Only some of the elements of the pipeline are indicated to simply illustrate the complexity a pipeline may have. Each Table is indicated by the term Table, followed by its numeric identifier. Each group table is simply indicated as "Group". The boxes represent different actions that may be performed, or different elements within the represented pipeline. The indicated tables are populated by the controller based on various network information and events. The processing of a packet starts at Table 0, and continues in the direction of the arrows. In every table, the packet is checked for a match, and if so, one or more actions are executed. A table miss results in the packet being returned to the controller, which is indicated in the Figure by bold arrows.

With such complex pipelines and the scale that OpenFlow switches supports, when a packet does not go through its intended packet processing path, and it gets dropped, it becomes extremely difficult to troubleshoot. A packet may be dropped, for example, because of misconfiguration or an error in the application or the controller. A sample of OpenFlow rules may look as follows:

stack@osc-1:~/devstack$ sudo ovs-ofctl dump-flows br-int-OOpenflow13
OFPST_FLOW reply (OF1.3) (xid=0x2):
cookie=0x8000000, duration=860.913s, table=0, n_packets=77, n_bytes=6784, priority=4,in_port=1 actions=write_metadata:0x60000000000/0xffffff0000000000,goto_table:16
cookie=0x8000000, duration=815.606s, table=0, n_packets=72, n_bytes=6462, priority=4,in_port=2 actions=write_metadata:0x80000000000/0xffffff0000000000,goto_table:16
cookie=0x100000, duration=998.357s, table=0, n_packets=0, n_bytes=0, priority=0 actions=goto_table:80
cookie=0x1100000, duration=998.357s, table=10, n_packets=0, n_bytes=0, priority=0 actions=goto_table:11
cookie=0x6800000, duration=860.795s, table=16, n_packets=2, n_bytes=674, priority=50,udp,dl_src=fa:16:3e:45:ea:2e,tp_src=68,tp_dst=67 actions=write_actions(CONTROLLER:65535)
cookie=0x6800000, duration=815.516s, table=16, n_packets=2, n_bytes=674, priority=50,udp,dl_src=fa:16:3e:09:78:b4,tp_src=68,tp_dst=67 actions=write_actions(CONTROLLER:65535)
cookie=0x6800000, duration=998.356s, table=16, n_packets=145, n_bytes=11898, priority=0 actions=goto_table:17
cookie=0x8040000, duration=44.137s, table=17, n_packets=0, n_bytes=0, priority=3, metadata=0x6000060000000000/0xffffff0000000000 actions=write_metadata:0x800006138a000000,goto_table:50
cookie=0x8000001, duration=44.137s, table=17, n_packets=40, n_bytes=3808, priority=2, metadata=0x60000000000/0xffffff0000000000 actions=write_metadata:0x6000060000000066,goto_table:21
cookie=0x8040000, duration=41.156s, table=17, n_packets=0, n_bytes=0, priority=3, metadata=0x6000080000000000/0xffffff0000000000 actions=write_metadata:0x800008138b000000,goto_table:50
. . . .
. . . .
cookie=0x8110006, duration=44.326s, table=80, n_packets=2, n_bytes=84, priority=100,arp,

```
metadata=0x6000006000000066/0xffffff00ffffffff,arp_op=1
actions=CONTROLLER:65535
cookie=0x8110006, duration=44.320s, table=80, n_pack-
ets=0,           n_bytes=0,           priority=100,arp,
metadata=0x6000006000000066/0xffffff00ffffffff,arp_op=2
actions=CONTROLLER:65535
cookie=0x8110008, duration=41.641s, table=80, n_pack-
ets=5,           n_bytes=210,         priority=100,arp,
metadata=0x6000008000000066/0xffffff00ffffffff,arp_op=1
actions=CONTROLLER:65535
cookie=0x8110008, duration=41.638s, table=80, n_pack-
ets=0,           n_bytes=0,           priority=100,arp,
metadata=0x6000008000000066/0xffffff00ffffffff,arp_op=2
actions=CONTROLLER:65535
cookie=0x1030000, duration=998.356s, table=80, n_pack-
ets=0, n_bytes=0, priority=0 actions=resubmit(,17)
stack@osc-1:~/devstack$ sudo ovs-ofctl dump-groups br-
int-OOpenflow13
OFPST_GROUP_DESC reply (OF1.3) (xid=0x2):
group_id=150001,type=all,bucket=actions=set_field:fa:16:
3e:45:ea:2e→eth_dst,output:1
group_id=150000,type=all,bucket=actions=set_field:fa:16:
3e:09:78:b4→eth_dst,output:2
group_id=210003,type=all,bucket=actions=set_field:
0x6→tun_id,resubmit(,55)
group_id=210005,type=all,bucket=actions=set_field:
0x8→tun_id,resubmit(,55)
```

If no match is found in a flow table, which may be referred to as a table miss, the outcome may depend on configuration of the table-miss flow entry: For example, the packet may be forwarded to the controller(s), the packet may be dropped, or the packet may continue to the next flow table. Details on the description of the controller, the switch, and the pipeline processing are provided in the OpenFlow specification, which may be found in https://www.opennetworking.org/images/stories/downloads/sdn-resources/onf-specifications/openflow/openflow-switch-v1.5.0.noipr.pdf. To drop a packet may be understood as to discard the packet. When a packet drop is reported in such a huge pipeline to a particular destination, today there are hardly any mechanisms to display the OpenFlow route installed for that destination. Troubleshooting an error from hundreds of thousands of flows is difficult, error-prone, and time consuming.

Several embodiments are comprised herein, which address these problems of the existing methods. Embodiments herein may be understood to relate to providing methods and apparatuses enabling troubleshooting in SDN, that is, enabling to determine a route followed by a packet in a pipeline in order to determine in turn where a processing error may have occurred.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, the terms used herein may need to be reinterpreted in view of possible terminology changes in future radio access technologies.

Figure 2:
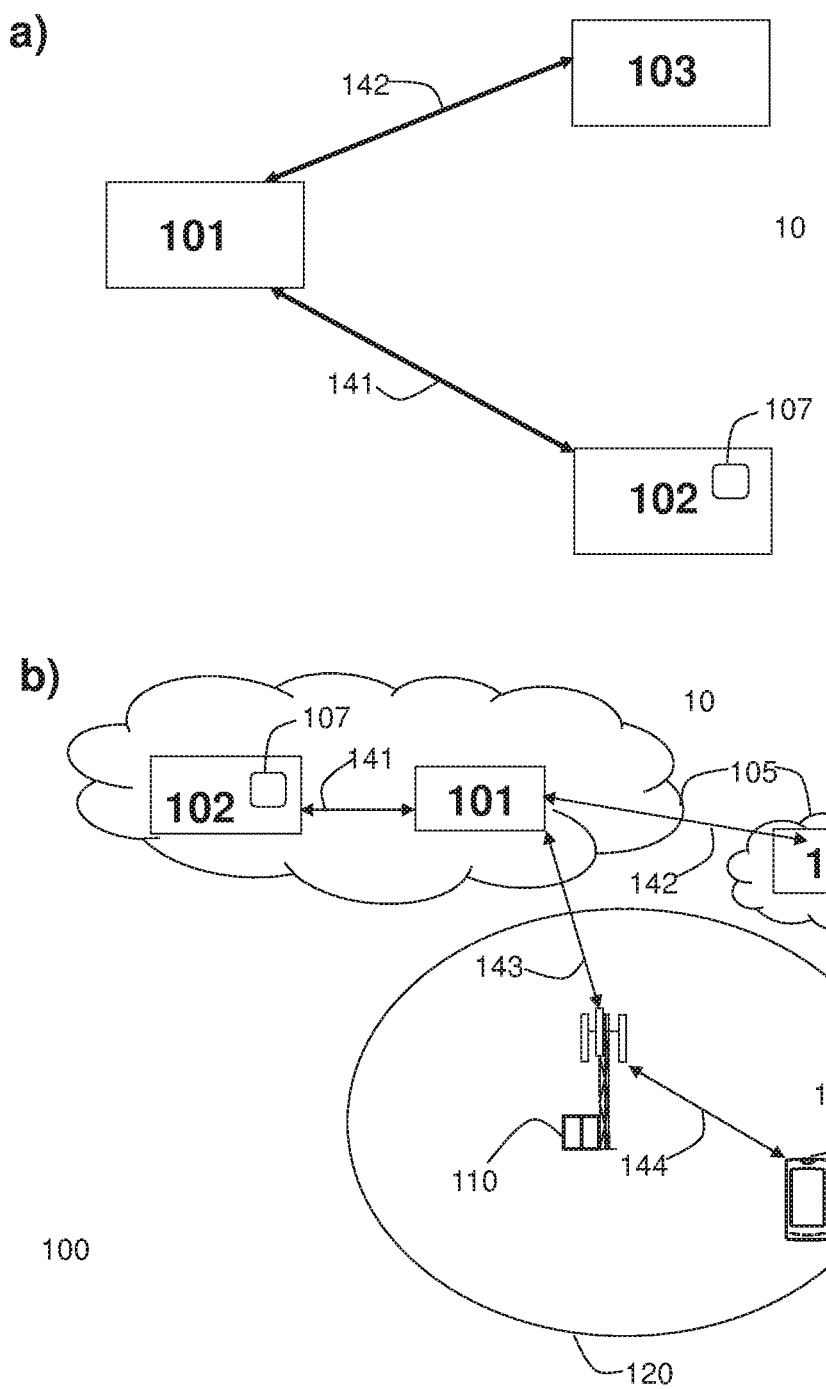
FIG. 2 is a schematic diagram illustrating two non-limiting examples in a) and b), respectively, of an SDN, according to embodiments herein.

FIG. 2 depicts two non-limiting examples, in panels a) and b), respectively, of an SDN 10, in which embodiments herein may be implemented. The SDN 10 may be understood as a computer network, as depicted schematically in in the non-limiting example of FIG. 2a. In other example implementations, such as that depicted in the non-limiting example of FIG. 2b, the SDN 10 may be implemented in a telecommunications network 100, sometimes also referred to as a cellular radio system, cellular network or wireless communications system. The telecommunications network 100 may for example be a network such as 5G system, or Next Gen network. In some examples, the telecommunications network 100 may be a cellular system, comprising network nodes which may serve receiving nodes, such as wireless devices, with serving beams. This may be a typical case in a 5G network using New Radio (NR). The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as 6LowPAN, Bluetooth, or any cellular network or system.

The SDN 10 comprises a plurality of network nodes, whereof a first network node 101, a second network node 102, and third network node 103 are depicted in FIG. 2. Each of the first network node 101, the second network node 102, and the third network node 103 may be understood, respectively, as a first computer system, a second computer system, and a third computer system. In some examples, each of the first network node 101, the second network node 102 and the third network node 103 may be implemented, as depicted in the non-limiting example of FIG. 2b, as a standalone server in e.g., a host computer in the cloud 105. Each of the first network node 101, the second network node 102, and the third network node 103 may in some examples be a distributed node or distributed server, with some of their respective functions being implemented locally, e.g., by a client manager, and some of its functions implemented in the cloud 105, by e.g., a server manager. Yet in other examples, each of the first network node 101 and the second network node 102 may also be implemented as processing resources in a server farm. Each of the first network node 101 and the second network node 102 may be under the ownership or control of a service provider, or may be operated by the service provider or on behalf of the service provider.

Typically, as depicted in the examples of FIG. 2, the first network node 101 and the second network node 102 may be separate entities. However, in some examples, the first network node 101 and the second network node 102 may be co-located or be the same entity. All the possible combinations are not depicted in FIG. 2 to simplify the Figure. The first network node 101 may be understood to run a controller, that is, an OpenFlow controller, in the SDN 10. The second network node 102 may be understood to be run a switch, that is an OpenFlow Logical Switch, in the SDN 10. The second network node 102 comprises a pipeline 107. The pipeline 107 comprises a set of flow tables, or a set of flow tables and one or more group tables.

The third network node 103 may be understood to be a host computer managing a host application. The host application may be operable to provide a service to a remote user, that is a wireless device such as the wireless device 130 described below, which may be connecting via an OTT connection terminating at the User Equipment (UE) and the third network node 103. In providing the service to the remote user, the host application may provide user data which may transmitted using the OTT connection.

A radio network node 110 is depicted in the non-limiting example of FIG. 2b. The radio network node 110 may be comprised in the telecommunications network 100, which may comprise a plurality of radio network nodes. The radio network node 110 may be a radio base station, or any other radio network node with similar features capable of serving a wireless device, such as a user equipment or a machine type communication device, in the telecommunications network 100. In some particular embodiments, the radio network node 110 may be a transmission point operating on NR, for example a New Radio (NR) NodeB or a Next Generation radio network node, that is, a gNB. In some examples, the radio network node 110 may be radio base station operating on LTE, such as an eNB.

The telecommunications network 100 may cover a geographical area which may be divided into cell areas, wherein each cell area may be served by a radio network node, although, one radio network node may serve one or several cells. The telecommunications network 100 may comprise at least a cell 120. In the non-limiting example depicted in FIG. 2b, the radio network node 110 serves the cell 120. The radio network node 110 may be of different classes, such as, e.g., macro base station (BS), home BS or pico BS, based on transmission power and thereby also cell size. The radio network node 110 may be directly connected to one or more core networks, which are not depicted in FIG. 2 to simplify the Figure. In some examples, the radio network node 110 may be a distributed node, such as a virtual node in the cloud, and it may perform its functions entirely on the cloud, or partially, in collaboration with a radio network node.

A plurality of wireless devices may be located in the telecommunications network 100, whereof a wireless device 130, which may also be referred to as a device, is depicted in the non-limiting example of FIG. 2b. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the telecommunications network 100 may be enabled to communicate wirelessly in the telecommunications network 100. The communication may be performed e.g., via a RAN, and possibly the one or more core networks, which may be comprised within the telecommunications network 100.

The first network node 101 is configured to communicate within the computer system with the second network node 102 over a first link 141, e.g., a radio link, a wired link an infrared link, etc. . . . The first network node 101 is configured to communicate within the computer system 10 with the third network node 103 over a second link 142, e.g., another radio link, another wired link, or another infrared link, etc. . . . The radio network node 110 may be configured to communicate in the telecommunications network 100 with the wireless device 130 over a radio link, which is depicted in FIG. 2 as a part of the second link 142. The first network node 101 is configured to communicate within the computer system 10 with the radio network node 110 over a third link 143, e.g., a radio link, a wired link, etc. . . . The radio network node 110 is configured to communicate within the telecommunications network 100 with the wireless device 130 over a fourth link 144, e.g., a radio link.

Any of the first link 141, the second link 142, the third link 143 and the fourth link 144 may be understood to be comprised of a plurality of individual links. Any of the first link 141 and the second link 142 may be a direct link or it may go via one or more computer systems or one or more core networks in the SDN 10, which are not depicted in FIG. 2, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 2.

Any of the first network node 101, the second network node 102 and the third network node 103 may be understood to communicate with each other using OpenFlow, that is, the OpenFlow specification.

In general, the usage of "first", "second", and/or "third", herein may be understood to be an arbitrary way to denote different elements or entities, and may be understood to not confer a cumulative or chronological character to the nouns they modify.

Figure 3:
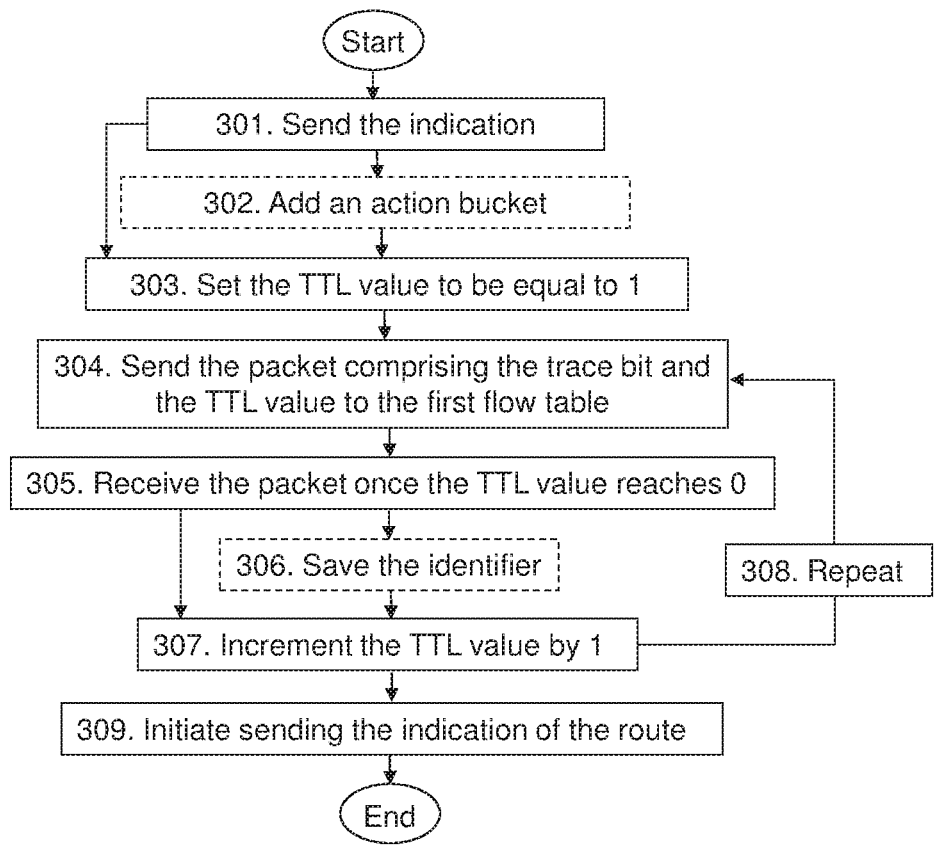
FIG. 3 is a flowchart depicting embodiments of a method in a first network node, according to embodiments herein.

Embodiments of a method performed by the first network node 101, will now be described with reference to the flowchart depicted in FIG. 3. The method may be understood to be for tracing a packet in a pipeline 107. To trace the route of the packet in the pipeline 107 may be understood as to determine the order and identity of flow tables and/or group tables that processing, or that have processed, the packet in the pipeline 107. The pipeline 107 is comprised in the second network node 102. The pipeline 107 comprises a set of flow tables. The first network node 101 and the second network node 102 operate in the SDN 10 using OpenFlow.

The the first network node 101 may manage a controller.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

Action 301

In the course of operations of the SDN 10, it may be necessary to determine the route, that is, the path, that a packet may take in the pipeline 107 to reach its destination, especially if it is detected that the packet is dropped before it reaches its destination. The first network node 101 may need to find where the error in the processing of the packet may have occurred in order to enabling to fix it and therefore enabling to guarantee that the packet may reach its intended destination. In other words, it may be necessary to troubleshoot where one or more errors may be taking place in the flow tables and/or in the group tables that may be comprised in the pipeline 107. In order to identify the route followed by the packet, that is, the identity of the flow tables and/or of the group tables that may be processing the packet in the pipeline 107, and in their order, the first network node 101, in this Action 301, sends a first indication to the second network node 102. The second network node 102 is the network node that is to receive the packet. The second network node 102 may manage an OpenFlow switch. Therefore, in this Action 301, the controller may send the first indication to the switch. In order to allow the first network node 101 to trace the packet, the packet comprises a trace bit. In one embodiment, the trace bit may be a bit in a metadata field, e.g., an OpenFlow metadata field, which may be associated with the packet. The metadata may be understood as a maskable register that may be used to carry information from one table to the next. The metadata may be, for example, a 64 bit value carried with the packet. One bit of this metadata may be used to store the trace bit. The one bit may be any bit of these 64 bits. Setting the trace bit for the packet may then indicate that the packet is a trace packet.

In addition, the packet is to be provided with a Time To Live (TTL) value. The TTL may be understood as a mechanism that may limit the lifespan or lifetime of the packet in a computer or network such as the software define network 100. The TTL value may indicate a number of hops the packet may be allowed to make before being returned to the first network node 101. The first indication indicates, e.g. instructs, to the second network node 102, to have each flow table comprised in the set of flow tables decrement the TTL value by 1, based upon detection of the trace bit. In other words, the first network node 101 may program each open flow table with an action of decrement TTL, based on the trace bit.

Action 301 may be understood to be performed where the second network node 102 may be configured, either by a further indication from the first network node 101, of by a pre-configuration, to: i) send the packet to the first network node 101 once the TTL value is decreased to 0, and ii) send the packet to a next flow table in the set of flow tables, once the TTL value is decreased to a resulting value different than 0. The next flow table may be understood to be determined by the order in the set of flow tables.

Traceroute may be understood as a computer network diagnostic tool for displaying the route, that is the path, and measuring transit delays of packets across an Internet Protocol (IP) network. In some embodiments herein, the packet may be a Traceroute packet, that is, a User Datagram Protocol (UDP) packet with a TTL that may varying from 1 to n. In such embodiments, the first indication may be sent to the second network node 102 as a traceroute message. The traceroute message may be formed in the first network node 101 as a problem message based on a problem statement with a particular 6 tuple. The 6 tuple may comprise: source-mac, destination-mac, source-ip, destination-ip, source-port, and destination-port, or some combinations of the same Embodiments herein may be understood to not be limited to just these 6 tuples, but any parameters of a packet may be set in the traceroute message. The first network node 101 may then send the traceroute message to the second network node 102, in table 0, with the trace bit set in packet metadata.

The sending in this Action 301 may be implemented, e.g., via the first link 141.

Action 302

As mentioned earlier, in some embodiments, the pipeline 107 may further comprise one or more group tables. The packet may in such embodiments be processed by the one or more group tables within an order of the flow tables in the set of flow tables. The set of flow tables has been set to process the packet in an order, e.g., by the third network node 103 running the host application. As a non-limiting illustrative example, the order may be, e.g., Table 0, Table 17, Table 22, Table 24, group 21004, group 21006. In this Action 302, the first network node 101 may add an action bucket to each of the one or more group tables. A group identifier may be pushed as a MultiProtocol Label Switching (MPLS) label to each packet in each of the one or more group tables. Similarly to what was described in Action 301 as instructed to be performed by each flow table in the set of flow tables, the action bucket may be understood to be to decrement the TTL value by 1, based upon detection of the trace bit in the packet. In these embodiments, the first indication may indicate to: i) send the packet to the first network node 101 once the TTL value is decreased to 0, and ii) send the packet to a next one of: a) flow table in the set of flow tables and b) group table in the pipeline 107, once the TTL value is decreased to a resulting value different than 0.

In other words, each group table may be added with a bucket with an action of pushing a group identifier, e.g., a group-id, as an MPLS label to the packet and decrement the TTL. The packet that may be sent to the first network node 101 when the TTL is 0 may be understood as the packet-in. The packet-in from a group table does not comprise the group-id. In order to identify the group-id of the group table from which the packet has been sent to the first network node 101, the group id may be pushed into the MPLS label before decrementing the TTL. Then, the MPLS-label from in this Action 302 may be used to get the group-id from the packet-in message.

This Action 302 enables the first network node 101 to trace the packet in the one or more group tables.

The adding in this Action 302 may be implemented by sending the action bucket to the second network node 102, e.g., via the first link 141.

Action 303

In order to start tracing the route of the packet in the pipeline, the first network node 101, in this Action 303, sets an initial value of the TTL value in the packet to be equal to 1. The initial value may be understood as the value of the TTL provided with the packet the very first time the packet is sent to the pipeline 107.

Action 304

In this Action 304, the first network node 101 sends the packet comprising the trace bit and the TTL value to the second network node 102. The packet is provided to a first flow table, e.g., table 0, comprised in the set of flow tables. The set of flow tables has been set to process the packet in an order, e.g., by the third network node 103 running the host application, as explained earlier.

The sending in this Action 304 may be implemented, e.g., via the first link 141.

Action 305

The first network node 101 then, in this Action 305, receives the packet from another flow table in the set of flow tables. This may be understood to happen as a consequence of the TTL value being decreased to 0 in one of the tables, or group tables in the pipeline 107. The another flow table may be understood to be the same as the first flow table, the very first time the packet is sent to the pipeline 107. However, the second and subsequent times, the another flow table may be different than the first flow table. The another flow table may also be a group table.

In the embodiments wherein the pipeline 107 may comprise the one or more group tables, it may be understood that the another flow table in the set of flow tables from which the packet is received may be comprised in one of: the set of flow tables and the one or more group tables.

The receiving in this Action 305 may be implemented, e.g., via the first link 141.

Action 306

After the first network node 101 receives the packet from the another flow table in the set of flow tables, the first network node 101 may save an identifier of at least one of: the flow table and the group table, from which the packet is received in Action 305. That is, the first network node 101 may store, e.g., in a memory, the identifier of the another flow table, so it may build the route of the packet, as it traverses the pipeline 107, in the order it may do so. For example, the first time the first network node 101 performs Action 306, the identifier saved will be "Table 0", the second time, "Table 17", the third time "Table 22", etc. . . . . . Therefore, in this Action 306, the first network node 101 may save an identifier of each flow table and/or group table in the pipeline 107, from which the packet is received in Action 305. Consequently, a different value of the identifier may be saved in every repetition of Action 305.

For each flow table, the identifier may be, e.g., the Table id. For each group table, the identifier may be, e.g., the group id.

Whenever the trace bit may be set in the packet-in message, and the packet received in Action 305 is the same as the packet the first network node 101 sent in Action 304, the first network node 101 may conclude that the packet-in is the reply for the trace packet that the first network node 101 has sent. The first network node 101 may then obtain the Table id from the packet-in message, and store it, according to Action 306.

When the trace packet-in message is an MPLS packet, the MPLS label may correspond to the group-id.

Action 307

For every remaining flow table in the set of flow tables, and for as long as there is at least one remaining flow table in the set of flow tables, following the order of the flow tables in the set of flow tables, and one flow table at a time, the first network node 101 then performs Action 307 and Action 308 until one of: i) a last flow table in the set of flow tables is reached, and ii) a criterion is met. In the embodiments wherein the pipeline 107 may comprise the one or more group tables, it may be understood that for every remaining flow table in the set of flow tables or group table in the pipeline 107, and for as long as there is at least one remaining: flow table in the set of flow tables or group table, of the one or more group tables, following the order, and one flow table or group table at a time, the first network node 101 may then perform Action 307 and Action 308 until one of: i) the last flow table in the set of flow tables is reached, and ii) the criterion is met. For the example used so far, the order of the flow tables is Table 0, Table 17, Table 22, Table 24, group 21004, and group 21006, in that order, until reaching group 21006. Otherwise, the criterion may set a condition that may indicate an error in the processing of the packet. The criterion may be configurable. The criterion may be for example, that a loop is detected, as will be described earlier, that is, that the packet follows the same sequence of tables a certain number of times. Another criterion may be that the packet is not received after a particular time window, which may indicate an error in the processing of the packet in the pipeline.

In Action 307, the first network node 101 increments the TTL value by 1.

Action 308

After the first network node 101 has incremented the TTL value by 1, the first network node 101, in this Action 308, repeats the sending of the packet in Action 304, and the receiving in Action 305 of the packet.

In the embodiments wherein the pipeline 107 may comprise the one or more group tables, it may be understood that the repeating in this Action 308 may also be of the sending in Action 304 of the packet, and the receiving in Action 305.

The first network node 101 may also repeat Action 306. From the table-id and group-ids, the trace of the flows for a particular destination may then be obtained by the first network node 101.

The trace packet may be dropped before sending the packet out of the second network node 101.

A non-limiting example of an output of the trace looks like:

Traceflow 10.10.10.1 switch1

Table 0-table 17-table 22-table 24-group 21004-group 21006

Action 309

In this Action 309, the first network node 101 initiates sending, to third network node 103, a second indication of the route followed by the packet in the pipeline 107, based on one of: iii) the packet having been received from all the flow tables in the set of flow tables, and iv) the criterion having been met.

In the embodiments wherein the pipeline 107 may comprise the one or more group tables, it may be understood that, in this Action 309, the first network node 101 may initiate sending, to the third network node 103, the second indication of the route followed by the packet in the pipeline 107, based on one of: iii) the packet having been received from all the flow tables in the set of flow tables and all the one or more group tables, and iv) the criterion having been met.

The second indication may be further based on the saved identifier in Action 306. It may be understood that the identifier may have a different value for each flow table in the set of flow tables and each of the one or more group tables.

Following the example provided so far, in the event that no errors were found, an output of the trace, which may be provided in the second indication, may look like:

Table 0-Table 17-Table 22-Table 24-group 21004-group 21006.

Also following the example provided so far, in the event that an error in Table 24 found, the output of the trace, which may be provided in the second indication, may look like:

Table 0-Table 17-Table 22-Table 24.

To initiate sending may be understood to comprise to send, or to trigger or enable another entity to send.

The sending in this Action 309 may be implemented, e.g., via the second link 142.

Figure 4:
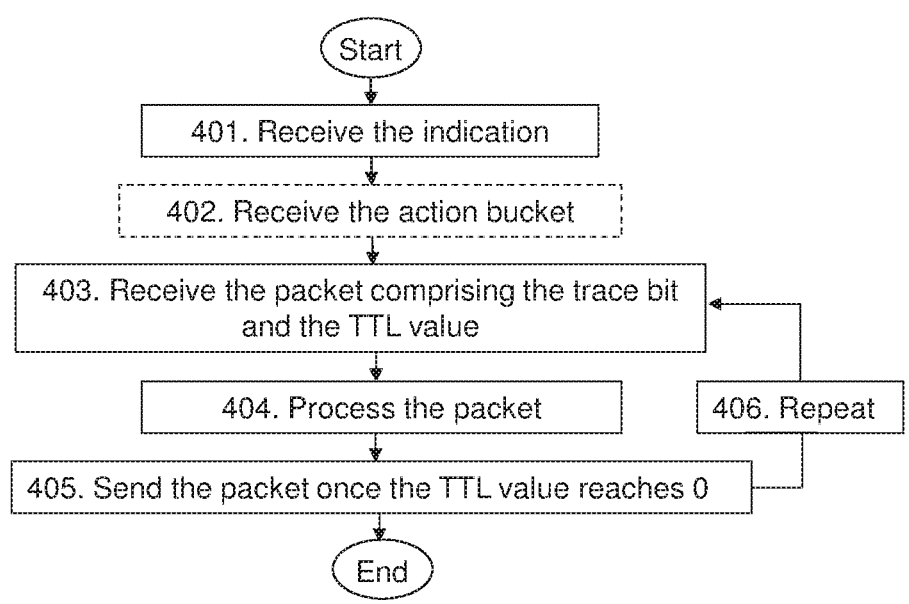
FIG. 4 is a flowchart depicting embodiments of a method in a second network node, according to embodiments herein.

Embodiments of a method performed by a second network node 102, will now be described with reference to the flowchart depicted in FIG. 4. The method is for tracing the packet in the pipeline 107. The pipeline 107 is comprised in the second network node 102. The pipeline 107 comprises the set of flow tables. The second network node 102 operating in the SDN 10 using OpenFlow.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed boxes.

The detailed description of some of the following corresponds to the same references provided above, in relation to the actions described for the first network node 101, and will thus not be repeated here to simplify the description. For example, the packet may be a Traceroute packet. Also, the second network node 102 may manage an OpenFlow switch.

Action 401

The second network node 102, in this Action 401, receives the first indication from the first network node 101 that is to send the packet. As described earlier, the packet is to comprise the trace bit, and the packet is to be provided with the TTL value. The first indication indicates, to the second network node 102, that is, it instructs the second network node 102, to have each flow table comprised in the set of flow tables decrement the TTL value by 1 based upon detection of the trace bit.

The receiving in this Action 401 may be implemented, e.g., via the first link 141.

Action 402

As described earlier, in some embodiments, the pipeline 107 may further comprise the one or more group tables. The packet may be processed by the one or more group tables within the order of the flow tables in the set of flow tables. In such embodiments, the second network node 102 may, in this Action 402, receive, from the first network node 101, the action bucket for each one or more group tables. The group identifier may be pushed as the MPLS label to each packet in the one or more group tables. The action bucket may be to decrement the TTL value by 1 based upon detection of the trace bit in the packet.

The receiving in this Action 402 may be implemented, e.g., via the first link 141.

Action 403

In this Action 403, the second network node 102 receives the packet comprising the trace bit and the TTL value from the first network node 101. The packet is provided to the first flow table, e.g., Table 0, comprised in the set of flow tables. The set of flow tables has been set, e.g., by the third network node 103, to process the packet in an order.

A first time the packet is received, the TTL value provided with packet is equal to 1.

The receiving in this Action 403 may be implemented, e.g., via the first link 141.

Action 404

The second network node 102 may, in this Action 404, process the packet according to the received first indication. The processing may further comprise: i) sending the packet to the first network node 101 once the TTL value is decreased to 0, and ii) sending the packet to a next flow table in the set of flow tables, once the TTL value is decreased to a resulting value different than 0.

In embodiments wherein the second network node 102 may have received, from the first network node 101, the action bucket for each one or more group tables, the processing the packet in this Action 404 may further comprise processing the packet according to the received action bucket for each one or more group tables. In such embodiments, the processing in this Action 404 may further comprise: i) sending the packet to the first network node 101 once the TTL value is decreased to 0, and ii) sending the packet to the next one of: a) flow table in the set of flow tables and b) group table in the pipeline 107, once the TTL value is decreased to a resulting value different than 0.

Action 405

The second network node 102, in this Action 405, sends the packet from another flow table in the set of flow tables to the first network node 101 once the TTL value is decreased to 0.

In embodiments wherein the second network node 102 may have received, from the first network node 101, the action bucket for each one or more group tables, the another flow table in the set of flow tables from which the packet is sent to the first network node 101 is comprised in one of: the set of flow tables and the one or more group tables.

Action 406

The second network node 102, in this Action 406, for every remaining flow table in the set of flow tables, and for as long as there is at least one remaining flow table in the set of flow tables, following the order of the flow tables in the set of flow tables, and one flow table at a time, repeats the receiving in Action 403 of the packet, with the TTL value incremented by 1, the processing in Action 404 and the sending in Action 405 of the packet, until one of: i) the last flow table in the set of flow tables is reached, and ii) the criterion is met.

In embodiments wherein the second network node 102 may have received, from the first network node 101, the action bucket for each one or more group tables, in this Action 406, for every remaining flow table in the set of flow tables or group table in the pipeline 107, and for as long as there is at least one remaining: flow table in the set of flow tables or group table, following the order, and one flow table or group table at a time, the second network node 102 may repeat, in this Action 406, the receiving in Action 403 of the packet, with the TTL value incremented by 1, the processing in Action 404 and the sending in Action 405 of the packet, until one of: i) the last flow table in the set of flow tables or group table is reached, and ii) the criterion is met.

In some examples, the processing in Action 404 may further comprise resubmitting the packet to the same table. To avoid having the packet loop in resubmission to the same table upon detection of the trace bit, the processing in this Action 404 may further comprise, clearing the trace bit, and setting a register 0 to 1. The next time around the packet reaches the same table, the trace bit may be copied again upon existing the table to the register 0. That is, it may be inserted back into the packet, so the next table may detect the trace bit, and process the packet accordingly.

The methods just described as being implemented by the first network node 101 and the second network node 102 will now be described in further detail next, in relation to FIG. 5, FIG. 6 and FIG. 7, with particular non-limiting examples wherein the first network node 101 may be referred to as the controller, and the second network node 102 may be referred to as the switch.

Figure 5:
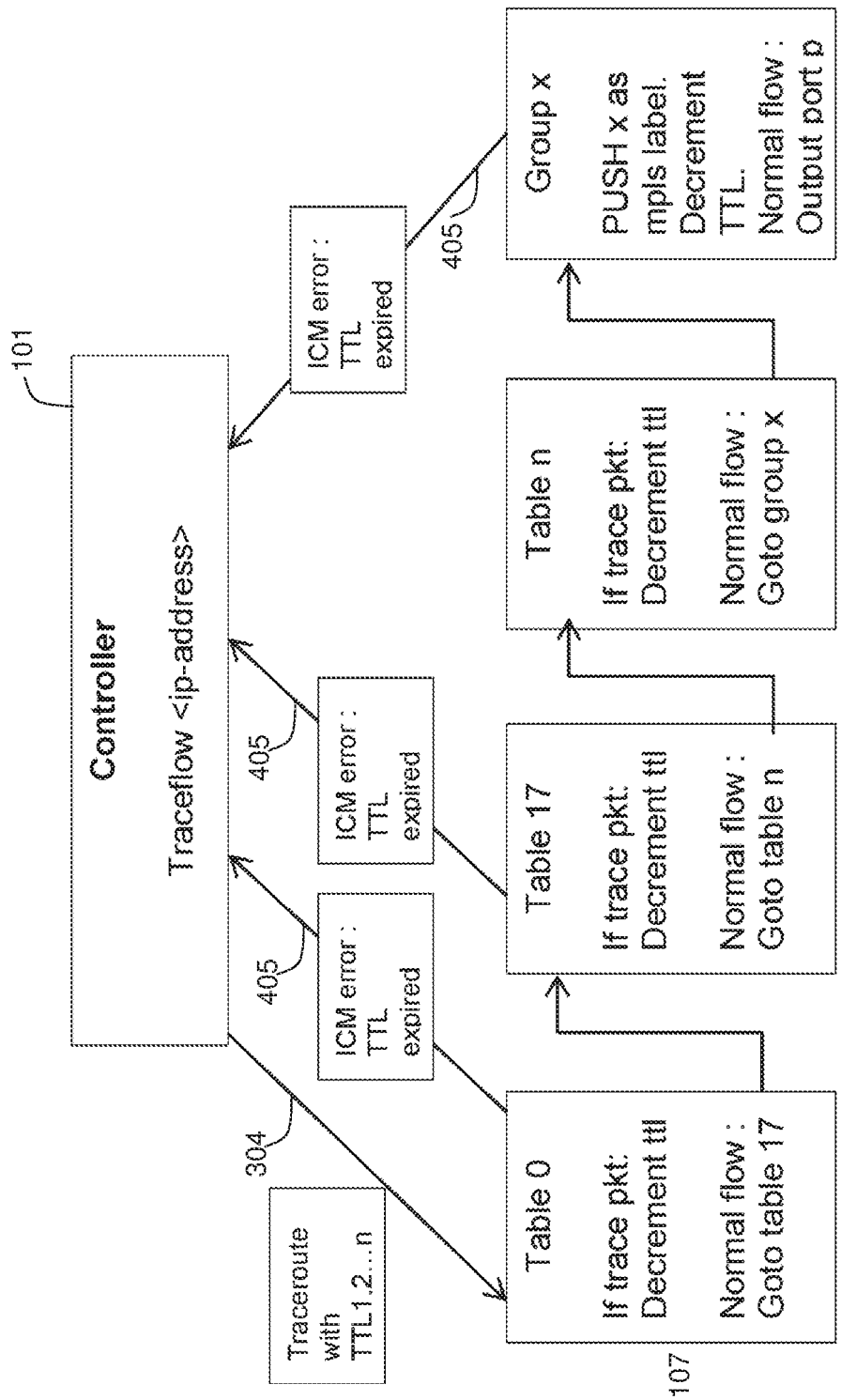
FIG. 5 is a schematic diagram illustrating an example of a method in a first network node and in a second network node, according to embodiments herein.

FIG. 5 is a schematic diagram depicting a non-limiting example of processing of the packet in the pipeline 107, according to embodiments herein. In this particular example, the pipeline 107 comprises n flow tables, which may be referred to as OpenFlow tables, and x Group tables. The pipeline 107 is set to send/deliver the packet to a particular destination, in this case, a particular Internet Protocol (IP) address (ip-address). The finding of the route or flow or trace of a packet to a particular destination according to embodiments herein may be referred to herein as a traceflow. The traceflow may be understood to work as follows.

When the traceflow is requested to a particular destination, the decrement TTL action is programmed, according to the first indication sent in Action 301, in all the tables in the particular switch if the trace bit is set. Then, a traceroute packet is formed to be sent to that destination with the metadata trace bit set and TTL value set to 1. Now this packet is sent, according to Action 304, to the OpenFlow pipeline 107, that is to the Table 0. The packet now undergoes packet processing, according to Action 404. Since the trace bit is set, the TTL will be decremented by 1 in Table 0. Now the TTL will be decreased to 0. As per the OpenFlow specification cited earlier, "The OpenFlow switch checks for packets with invalid IP TTL or MPLS TTL and rejects them. Checking for invalid TTL does not need to be done for every packet, but it must be done at a minimum every time a decrement TTL action is applied to a packet. The asynchronous configuration of the switch may be changed (see 6.1.1) to send packets with invalid TTL to the controllers over the control channel via a packet-in message (see 6.1.2)". This is provided as an Internet Control Message Protocol (ICMP) error, indicating that the TTL has expired. This will be the case, e.g., the first time the packet is sent to the pipeline 107. Therefore, this packet will be sent to the first network node 101, according to Action 405.

After receiving the packet according to Action 305, from the packet-in message, the table-id where the packet was processed will be known to the first network node 101. The first network node 101 may then save the table-id and now send the packet to the pipeline 107 with TTL2, which will get expired in the second table in the pipeline 107, here Table 17. The first network node 101 may then again save the table-id for the second table.

All the x group tables may be added with a bucket where the action will be to copy the group-id as MPLS label, and decrement TTL. Once the packet reaches the group table, similarly to once it is processed by a flow table, the TTL may expire and the packet may be sent back to first network node 101, according to Action 405. The first network node 101 may get the group-id from the MPLS label of the packet-in message. The first network node 101 may save the group-id as well. Finally the first network node 101 may display all the saved table-ids and group-ids as a trace to the end of pipeline processing, in the second indication. When, in this case, the last group table is reached, the packet is output to a port, port p, in the pipeline 107.

Figure 6:
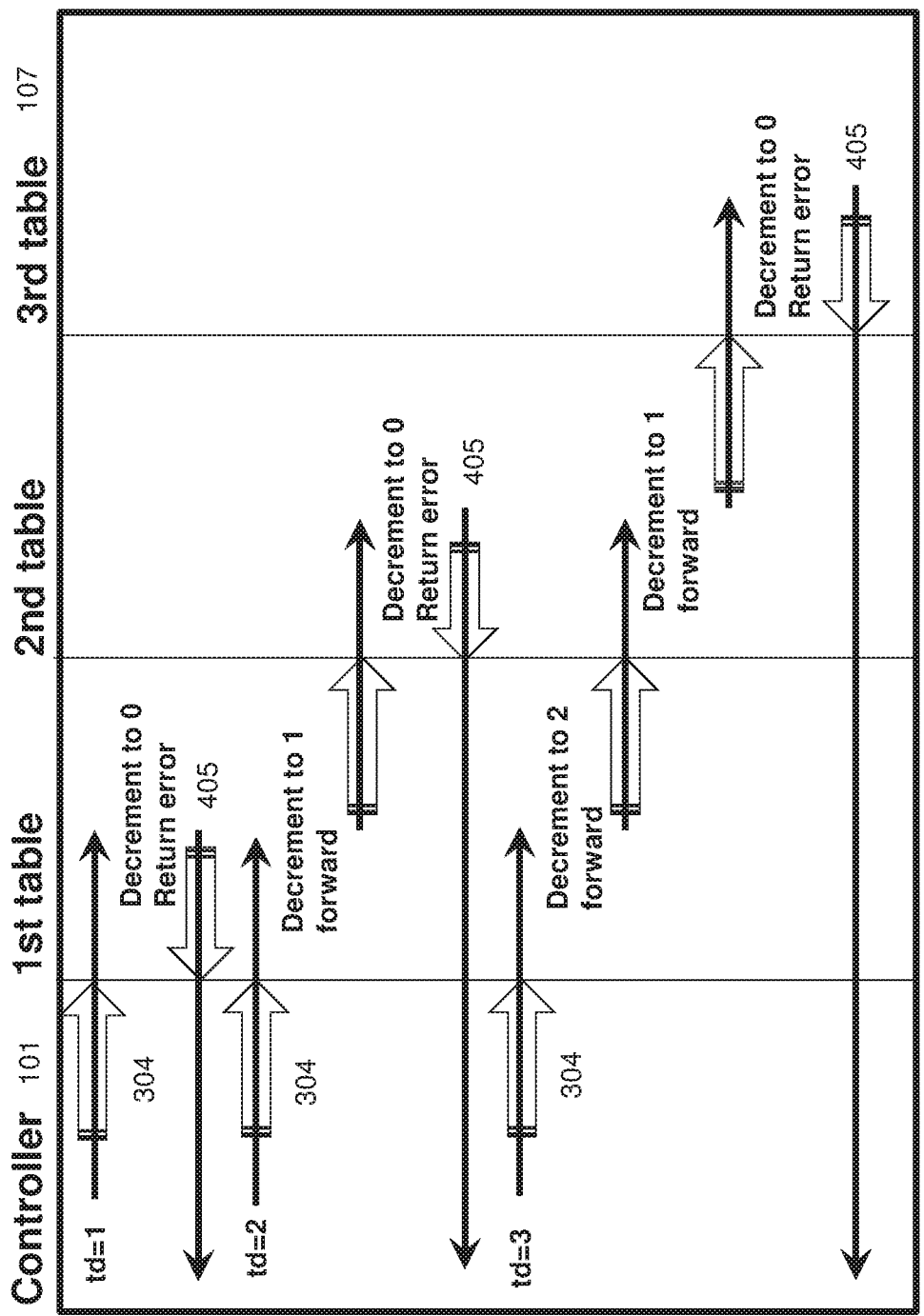
FIG. 6 is another schematic diagram illustrating an example of a method in a first network node and in a second network node, according to embodiments herein.
Figure 7:
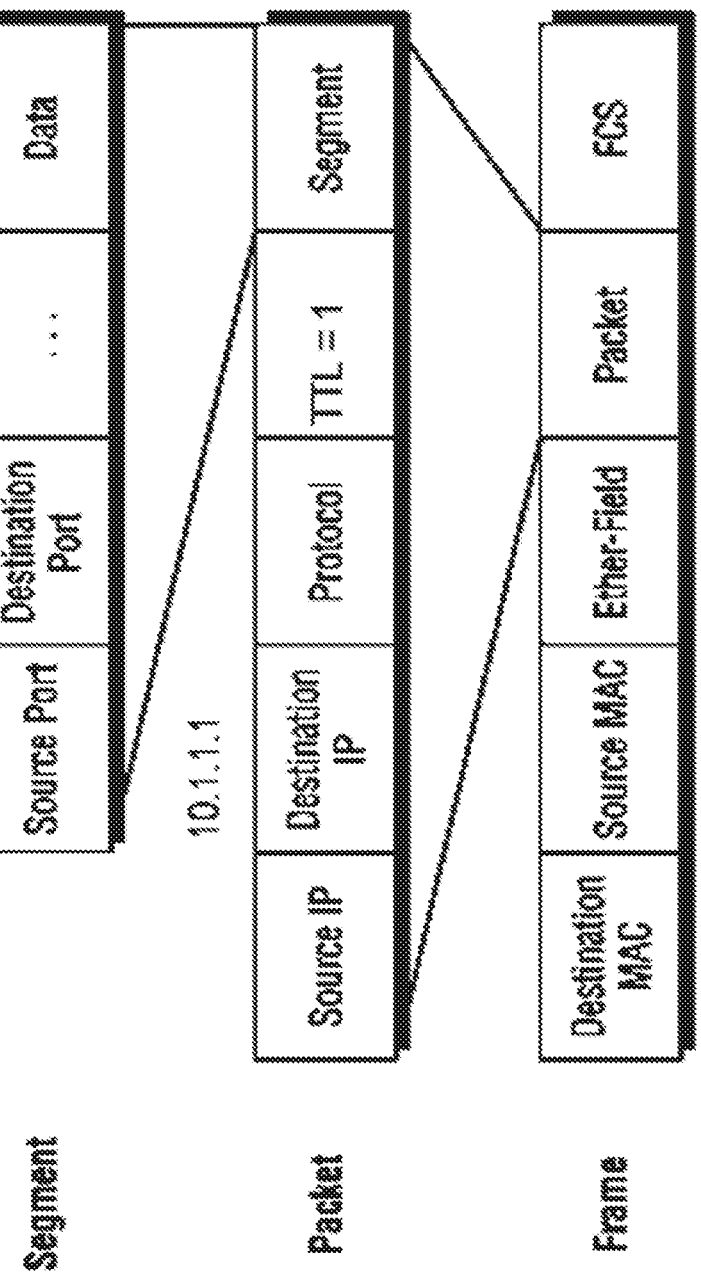
FIG. 7 is a schematic diagram illustrating an example of a packet, according to embodiments herein.

FIG. 6 is another schematic diagram, simplified with respect to that of FIG. 5, depicting another non-limiting example of processing of the packet in the pipeline 107, according to embodiments herein. In this particular example, the pipeline 107 comprises 3 flow tables: a $1^{st}$ table, a $2^{nd}$ table and a $3^{rd}$ table. The first network node 101, the controller, sends, according to Action 304, the packet with the trace bit to the second network node 102. The packet is provided to the first flow table, the $1^{st}$ table. At the $1^{st}$ table, if the trace bit is detected in the packet, the packet is processed by the second network node 102 according to the received first indication. The TTL value is decremented to by 1. If the resulting value is 0, the packet is sent to the first network node 101 in Action 405. The first network node 101 then increases the TTL value by 1 to 2, and sends the packet again to the $1^{st}$ table. This time around, Table 0 will decrease the TTL value of 2 by 1, to a resulting value of TTL=1, and will then send the packet to a next flow table in the set of flow tables, in this Example, the 2nd table. The same process is repeated for the $2^{nd}$ table and the $3^{rd}$ table.

Further details of embodiments herein will now be provided.

Setting the Traceflow Infrastructure

Setting the traceflow infrastructure may be understood as setting up additional flows and bucket to support embodiments herein. Whenever the first network node 101 may need to do the trace for a destination, e.g., it may need to know the flows that the packet traverses when it may enter the open pipeline 107 in a particular switch, here the second network node 102, on its way to a particular destination, it may set up new table flows and buckets, and modify existing flows as described in the following subsections.

Adding New Flows and Buckets:

By sending the first indication in Action 301, for every existing flow table in the pipeline 107, the first network node 101 may add a highest priority flow, or the first entry in the flow table, which may match for the trace bit, and the action may be to decrement the TTL, and resubmit to same table. To avoid having the packet loop in resubmission to the same table, upon detection of the trace bit, the action may further comprise, clearing the trace bit, and setting a register 0 to 1. The next time around the packet reaches the same table, the trace bit may be copied again to the register 0. That is, it may be inserted back into the packet, so the next table may detect the trace bit.

The first indication may therefore be a highest priority flow in all the tables schematically represented as follows:

| Match | Action |
| --- | --- |
| Trace bit in packet metadata | Action List<br>Decrement TTL, Reset the trace bit, set register0 to 1<br>Resubmit to same table. |

For every existing group, the first network node 101 may, according to Action 302, add a new bucket where the action may be to PUSH the group-id as the MPLS label, and to decrement the TTL.

The new action bucket that may be added in all the groups may be schematically represented as follows:

| New Bucket Action: |
| --- |
| Action List<br>PUSH group-id as MPLS LABEL,<br>Decrement IP TTL |

It may be noted that the group id may be 32 bits and MPLS label may be just 20 bits. If more than 20 bits are used as group-id, 2 MPLS labels may be used to store the group-id. The first network node 101 may program the bucket accordingly.

A packet-in may be understood as a packet coming from the second network node 102 to the first network node 101 a switch to a controller. As the packet-in from a group may not comprise the group-id, the pushed MPLS-label may be used to get the group-id from the packet-in message.

Modifying the Existing Flows:

Every existing flow in every table may be added with an Action of setting the trace bit based on register 0, as discussed earlier.

An original flow entry according to existing methods may be schematically represented as follows:

| Match | Action |
|---|---|
| Match on XXX | Action List -<br>1. YYY<br>2. ZZZ |

A flow entry, modified according to embodiments herein may be schematically represented as follows, wherein setting the register-0 in the packet metadata may be understood as an additional instruction:

| Match | Action |
|---|---|
| Match on XXX | Action List -<br>1. YYY<br>2. ZZZ<br>3. Set register-0 in packet metadata |

For normal traffic the register-0 value may be 0. Therefore, in none of the tables, TTL may be decremented for it. Accordingly, embodiments herein do not disturb the normal traffic at all.

Sending the Trace Packet

The first network node 101 may set up the packet with the desired content, e.g., destination, and may send the packet to the second network node 102, that is, the specified switch for which the flows may have to be found. A user may initiate a trace by sending a request. For example, for the following request:

traceflow <ip-address/mac-address> <switch-id> a particular example may be, e.g., traceflow 10.1.1.1 switch1

On getting a request like this, the first network node 101 may form a traceroute packet with destination IP of 10.1.1.1, TTL 1 and the trace bit set in the packet metadata, and may send the packet to switch1 OpenFlow pipeline, that is, to table 0 of switch1. FIG. 7 is a schematic diagram depicting what the packet may looks like in this example. It may be noted that this FIG. 7 is a simplification. The "Ether-Field", in particular, may be quite complex.

A request may be destined to a destination Medium Access Control (MAC), to get flows for that particular MAC. In that case, a packet may be formed with that destination MAC, with TTL=1. It may be noted that even if the flows for a MAC may be found, the packet may have an IP header, and the TTL may be decremented in the IP header. Also, in many cases, a packet with a same L2 header but with different L3 header may be treated differently, and follow a different path. Therefore, a user may be asked to configure a valid L3 header. If the user is not asked, then some random L3 may be chosen.

Figure 8:
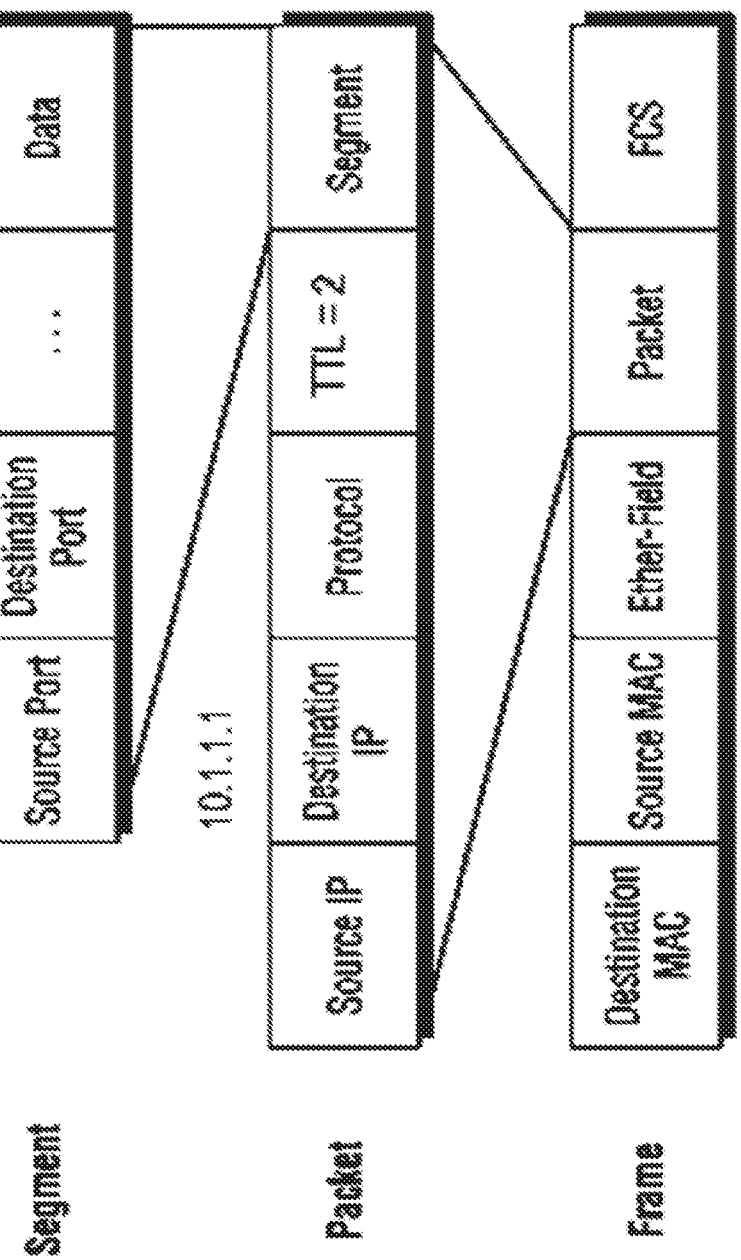
FIG. 8 is a schematic diagram illustrating another example of a packet, according to embodiments herein.

Now in Table 0, packet may be matched against the flow programmed in the section "Adding new flows and buckets", where the trace bit in packet metadata may be matched, and the TTL may be decremented. Also, the trace bit may be copied to register 0. Now, the TTL of the packet is 0. As per the OpenFlow specification, whenever the TTL of the packet is 0, it may be sent back to the controller as a Packet-in message. The first network node 101 may then get the packet-in message with the table-id set to table 0. The first network node 101 may then store the table-id, and sends the next packet with TTL 2. FIG. 8 is a schematic diagram depicting what the packet may looks like in this example, after the TTL value is incremented to 2.

This packet may again land in Table 0, where it may be matched for trace bit, and the TTL may be decremented. Now, since the TTL is not 0, the packet may get further processing, where the trace bit of the packet may be reset, and resubmitted to same table 0. Since the trace bit is not set, the packet may hit the normal flow for destination IP 10.1.1.1, and the corresponding action for the flow may be done to the packet. Along with that action, the trace bit may again be set in the packet metadata from register-0, and sent to next table for processing. For normal traffic, the register-0 value may be 0 and the trace bit may be not set.

In the next table, the packet may hit the trace bit action again, where the TTL of the packet may be decremented to 0. Now, the packet may be sent back to the first network node 101, with the table-id set to the next table id in the pipeline 107.

The first network node 101 may store the table id, according to Action 306, and may send a new packet with TTL 3 now.

Now, when a packet enters a table group, the packet may first go to the bucket which was programmed in the section "Adding new flows and buckets", where the group-id may be pushed, according to Action 302, as the MPLS label to the packet, and TTL may be decremented. If the TTL is 0, the packet may be sent back to the first network node 101. If not, this new bucket packet may be dropped. But the packet processing in other buckets may continue. When the first network node 101 may receive an MPLS packet with TTL 0, it may get the group id from the MPLS header, and store it, according to Action 306. The first network node 101 may again send the next packet with incremented TTL.

Figure 9:
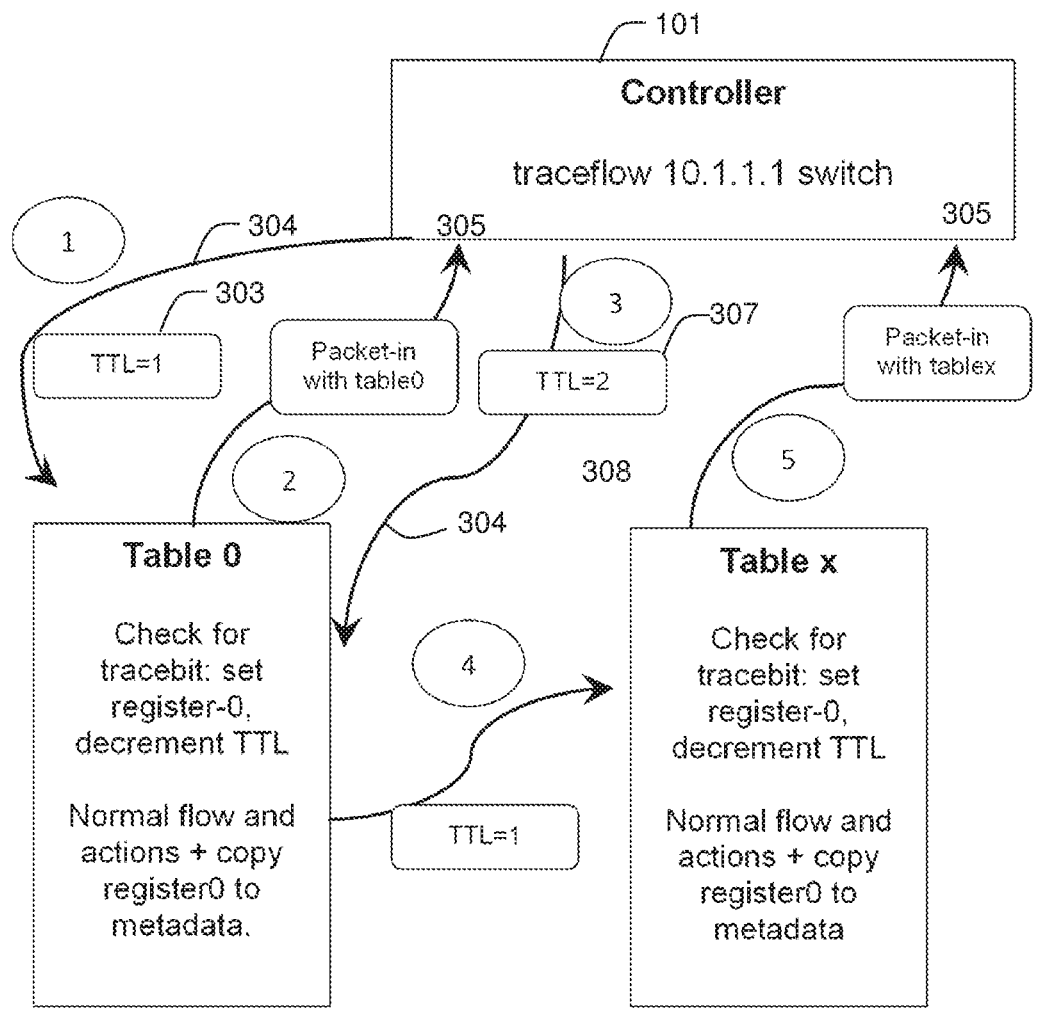
FIG. 9 is another schematic diagram illustrating an example of a method in a first network node and in a second network node, according to embodiments herein.

The process continues like this, until the packet has reached the end of pipeline 107 in the second network node 102. Action 303, Action 304, Action 305, Action 307 and Action 308 may be diagrammatically represented as depicted in FIG. 9, which has a similar description as that of FIG. 5.

Traceflow Collection in the Controller

Once the first network node 101 may stop receiving the packet-in error message with TTL 0, it may mean that the packet has reached the end of pipeline 107 in the second network node 102, the switch, and the first network node 101 may start collecting all the table-id and group-id stored till now, according to Action 306. The sequence of such table-ids and group-ids may be the trace flow for that particular pipeline 107. The first network node 101 may now remove the flows programmed for the traceflow collection.

For example, for: traceflow 10.1.1.1 switch1

The trace flow, which may be provided in the second indication, may be:

Table 0-Table 17-Table 22-group 1008-group 1020

The traceroute packet may be dropped before it may be sent out of the second network node 102, so that the sample packet may not reach the network. That is, since the packet with the trace bit is intended for diagnostic purposes, it may not leave the switch. All the packets with trace bit set may be either dropped in an egress dispatcher table, that is, the last table just before a packet is sent out of the second network node 102, or just before outputting them to a port.

Loop Detection

Embodiments herein may be used to detect the loops, that is, the errors, in the pipeline 107, which may be and OpenFlow pipeline. When an OpenFlow loop happens, the traffic to a/multiple destination(s) may get dropped. According to embodiments herein, the traceflow to that destination may be started, which may give a result like:

Table 0-Table 17-Table 52-Table 53-group 2020-Table 52-Table 53-group 2020-Table 52 . . . .

If the traceflow is not stopping even after a configured TTL value, the first network node 101 may look into the result, and may be able to determine the reason. According to embodiments herein, the first network node 101 may be enabled to find that a loop has occurred in table 52, 53, and group 2020. The first network node 101 may inform the third network node 113, managing the corresponding service that may have programmed these tables, and enable the network node 113 to recover from the loop.

Common Problems with Traditional IP TraceRoute and Existence of the Same in Embodiments Herein Traditional Traceroute may face a few challenges. One challenge is that when multiple paths exist towards the destination, an IP traceroute may fail to determine the exact path the packets follow. Embodiments herein may find only one route or trace of the multiple possible routes or traces. The same issue exists in OpenFlow in the case of group tables, especially in case of SELECT group, where the bucket taken by a packet may depend on a hash value of the packet, and may not be predicted. Therefore, in case of SELECT group, embodiments herein may not guarantee the exact path, but may be able to determine one among the valid path towards the destinations.

Another challenge is that if the route taken by a packet depends on the size or rate of the incoming traffic, embodiments herein may not be able to guarantee the route/traces of the packet. The packets that may be used in IP TraceRoute are typically non-representative in terms of the content, size, etc. of "real" IP Packets. Most of the OF pipeline may be independent of packet parameters like size, rate and all and may mostly depend on the headers. If a user wants to simulate other parameters like size, it may be added to a traceflow command such as:

traceflow 10.1.1.1 switch1-size 1000 which may create a packet with the mentioned parameters.

According to the foregoing, particular embodiments herein may be understood to relate to an efficient mechanism to find the flows programmed for a particular packet, that is, the flows that the packet has traversed when the packet enters the OpenFlow pipeline. According to the foregoing, particular embodiments herein may be understood to relate to setting up a mechanism to find an OpenFlow table/group trace in a data plane. Table or groups traversed by a packet may be found easily with the embodiments described herein. Particularly, embodiments herein may be understood to relate to efficient methods for troubleshooting in SDN using TTL.

Characteristics of embodiments herein may be summarized as follows. As a first characteristic, traceroute messages may be formed in the controller as a problem message based on a problem statement with a particular 6 tuple, e.g., 6 tuple: source-mac, destination-mac, source-ip, destination-ip, source-port, destination-port, or some combinations of the same, and sent to the OpenFlow switch, in table 0, with a trace bit set in the packet metadata.

As a second characteristic, each OpenFlow table may be programmed with an action of decrement the TTL based on the trace bit.

As a third characteristic, each group table may be added with a bucket with an action of pushing the group-id as the MPLS label, to the packet, and to decrement TTL.

As a third characteristic, the first traceroute packet may be sent to the switch with a TTL of 1. The first table may decrement the TTL and send back the packet to the controller as the packet may not be forwarded because the TTL has expired. The packet may then be resent with a TTL of 2, and the second table may return the TTL expired. This process may continue until the packet may reach the end of pipeline 107 where, based on the trace bit, the packet may be dropped.

As a fourth characteristic, an OpenFlow table trace for a particular packet may be found in the controller from the above error packet in message.

One advantage of embodiments herein is that, the packet processing path in an OpenFlow pipeline for a packet having a problem statement, e.g., a particular source and destination MAC, IP and Port and other parameters, in a switch is enabled to be traced.

Another advantage of embodiments herein is that, a human-readable result showing the pipeline traversed by a packet data unit (PDU) in an Open Flow pipeline may be easily produced.

Further, embodiments herein enable to detects error conditions that may not otherwise be determined.

Moreover, irrespective of the number of OpenFlow rules and scale, flows may be be traced very easily.

In addition, the overhead for tracing the flows/path is very minimal.

With the embodiments described for the OpenFlow loop detection, loops in an OpenFlow pipeline may be easily be detected. If the same table-id is getting repeated again and again, the controller may infer that the OpenFlow loop exists. Also, the table which may introduce the loop may be found easily.

Embodiments herein may be used to trace any kind of packet. The problem/trace packet may be formed with any desired parameters.

Moreover, embodiments herein are also applicable to all the switches which follow the OpenFlow specification. No specific OpenFlow extensions, such as a resubmit extension, are required.

Embodiments herein may be understood to not affect the normal traffic flow and flow entries.

A further advantage of embodiments herein is that both, flow tables and group tables may be traced.

Figure 10:
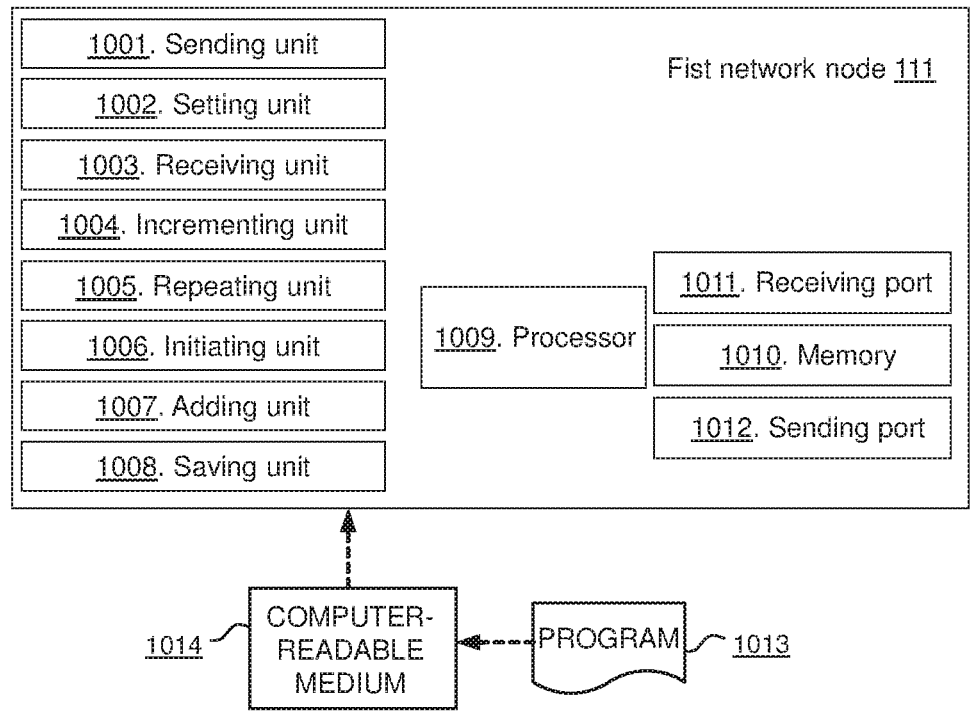
FIG. 10 is a schematic block diagram illustrating two non-limiting examples, a) and b), of a first network node, according to embodiments herein.
Figure 10:
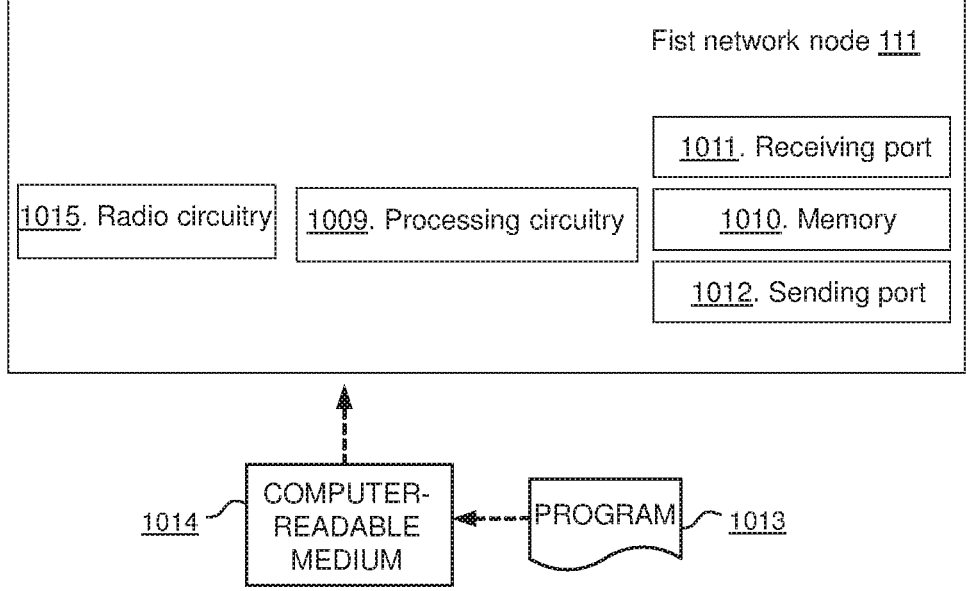

To perform the method actions described above in relation to FIG. 3, the first network node 101 may comprise the following arrangement depicted in FIG. 10. The first network node 101 is configured to trace the packet in the pipeline 107. The pipeline 107 is configured to be comprised in the second network node 102. The pipeline 107 is further configured to comprise the set of flow tables. The first network node 101 and the second network node 102 are configured to operate in the SDN 10 using OpenFlow.

The detailed description of some of the following corresponds to the same references provided above, in relation to the actions described for the first network node 101, and will thus not be repeated here. For example, the packet may be a Traceroute packet.

The first network node 101 is configured to, e.g. by means of a sending unit 1001 within the first network node 101 configured to, send the first indication to the second network node 102 that is to receive the packet, the packet being configured to comprise the trace bit, and the packet being further configured to be provided with the TTL value, the first indication being configured to indicate to have each flow table comprised in the set of flow tables decrement the TTL value by 1, based upon detection of the trace bit.

The first network node 101 is further configured to, e.g. by means of the sending unit 1001 within the first network node 101 further configured to, send the packet configured to comprise the trace bit and the TTL value to the second network node 102, wherein the packet is configured to be provided to the first flow table, e.g., table 0, configured to be comprised in the set of flow tables, the set of flow tables having been configured to process the packet in the order.

The first network node 101 is also configured to, e.g. by means of a setting unit 1002 within the first network node 101 configured to, set the initial value of the TTL value in the packet to be equal to 1.

The first network node 101 is further configured to, e.g. by means of a receiving unit 1003 within the first network node 101 configured to, receive the packet, from another flow table in the set of flow tables, with the TTL value of 0.

The first network node 101 is further configured to, for every remaining flow table in the set of flow tables, and for as long as there is at least one remaining flow table in the set of flow tables, following the order of the flow tables in the set of flow tables, and one flow table at a time: a) increment, e.g. by means of an incrementing unit 1004 within the first network node 101 configured to, the TTL value by 1, and b) e.g. by means of a repeating unit 1005 within the first network node 101 configured to, repeat the sending of the packet, and the receiving of the packet, until one of: i) the last flow table in the set of flow tables is reached, and ii) the criterion is met.

In some embodiments, the first network node 101 may be configured to, e.g. by means of an initiating unit 1006 within the first network node 101 configured to, initiate sending, to a third network node 103, a second indication of a route followed by the packet in the pipeline 107, based on one of: iii) the packet having been received from all the flow tables in the set of flow tables, and iv) the criterion having been met.

The second network node 102 may be configured to manage an OpenFlow switch.

In some embodiments, wherein the pipeline 107 may be further configured to comprise the one or more group tables, wherein the packet may be configured to be processed by the one or more group tables within the order of the flow tables in the set of flow tables, the first network node 101 may be configured to, e.g. by means of an adding unit 1007 within the first network node 101 configured to, add an action bucket to each of the one or more group tables, wherein a group identifier is configured to be pushed as a Multiprotocol Label Switching label to each packet in each of the one or more group tables, and wherein the action bucket is configured to decrement the TTL value by 1, based upon detection of the trace bit in the packet. In such embodiments, the another flow table in the set of flow tables from which the packet is configured to be received is configured to be comprised in one of: the set of flow tables and the one or more group tables.

In the embodiments wherein the pipeline 107 may be further configured to comprise the one or more group tables, wherein the packet may be configured to be processed by the one or more group tables within the order of the flow tables in the set of flow tables, the first network node 101 may be configured to, for every remaining flow table in the set of flow tables or group table in the pipeline 107, and for as long as there is at least one remaining: flow table in the set of flow tables or group table, following the order, and one flow table or group table at a time: a) increment, e.g. by means of the incrementing unit 1004 within the first network node 101 further configured to, the TTL value by 1, and b) e.g. by means of the repeating unit 1005 within the first network node 101 further configured to, repeat the sending of the packet, and the receiving, until one of: i) the last flow table in the set of flow tables or group table is reached, and ii) the criterion is met.

In such embodiments, the first network node 101 may be configured to, e.g. by means of the initiating unit 1006 within the first network node 101 configured to, initiate sending, to the third network node 103, the second indication of the route followed by the packet in the pipeline 107, based on one of: iii) the packet having been received from all the flow tables in the set of flow tables and all the one or more group tables, and iv) the criterion having been met.

In some embodiments, the first network node 101 may be configured to, e.g. by means of a saving unit 1008 within the first network node 101 configured to, save the identifier of at least one of: the flow table and the group table, from which the packet is configured to be received, wherein the second indication may be further configured to be based on the saved identifier. And, wherein to repeat may be further configured to further comprise to repeat the saving of the identifier.

Figure 11:
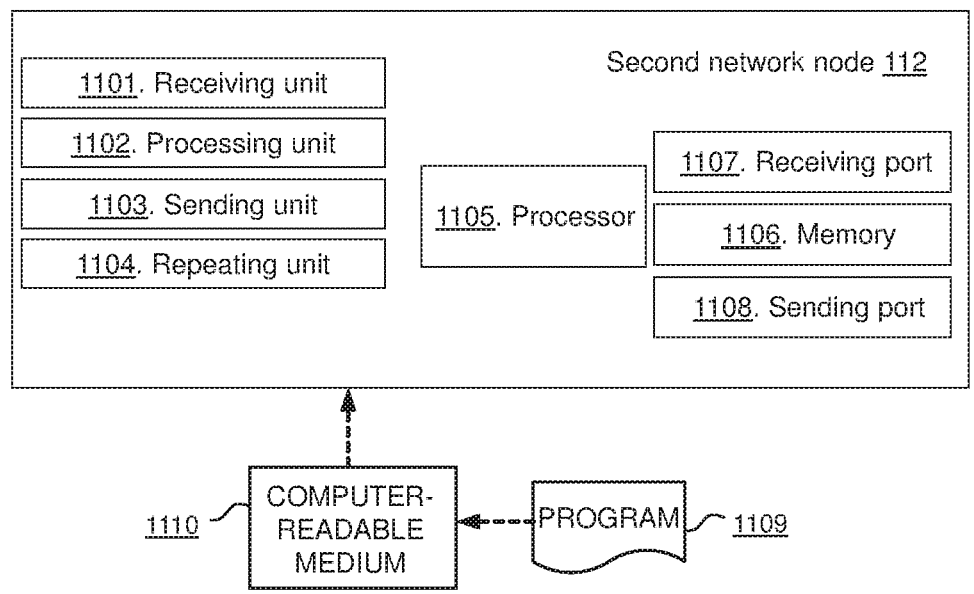
FIG. 11 is a schematic block diagram illustrating two non-limiting examples, a) and b), of a second network node, according to embodiments herein.
Figure 11:
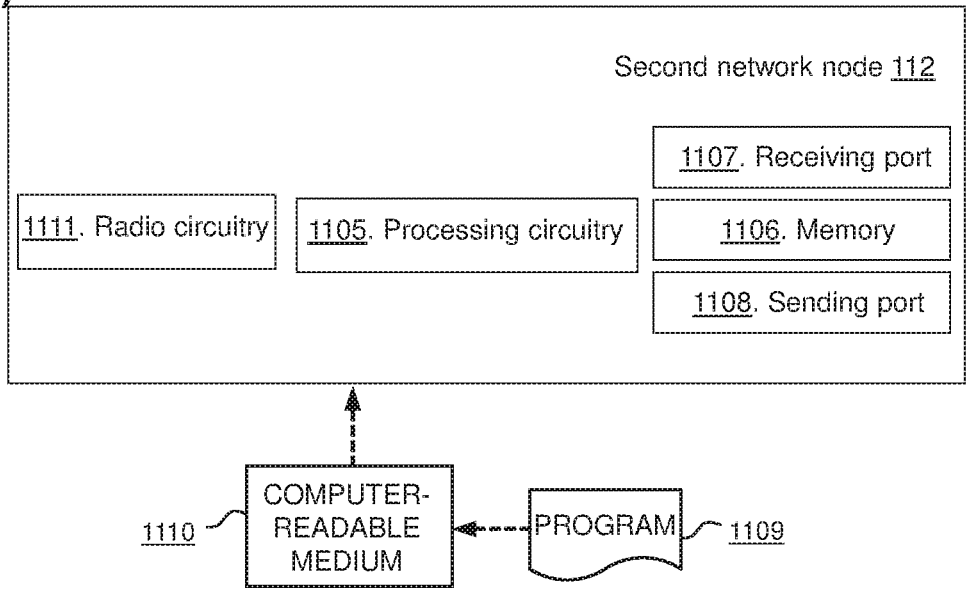

The embodiments herein may be implemented through one or more processors, such as a processor 1009 in the first network node 101 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first network node 101. One such carrier may be in the form of a CD ROM disc. It is however feasible with other data carriers such as a memory stick. The computer program code may furthermore be provided as pure program code on a server and downloaded to the first network node 101.

The first network node 101 may further comprise a memory 1010 comprising one or more memory units. The memory 1010 is arranged to be used to store obtained information, store data, configurations, schedulings, and applications etc. to perform the methods herein when being executed in the first network node 101.

In some embodiments, the first network node 101 may receive information from, e.g., the second network node 102 and/or the third network node 103, through a receiving port 1011. In some examples, the receiving port 1011 may be, for example, connected to one or more antennas in first network node 101. In other embodiments, the first network node 101 may receive information from another structure in the SDN 10 through the receiving port 1011. Since the receiving port 1011 may be in communication with the processor 1009, the receiving port 1011 may then send the received information to the processor 1009. The receiving port 1011 may also be configured to receive other information.

The processor 1009 in the first network node 101 may be further configured to transmit or send information to e.g., the second network node 102 and/or the third network node 103, through a sending port 1012, which may be in communication with the processor 1009, and the memory 1010.

Those skilled in the art will also appreciate that the sending unit 1001, the setting unit 1002, the receiving unit 1003, the incrementing unit 1004, the repeating unit 1005, the initiating unit 1006, the adding unit 1007 and the saving unit 1008 described above may refer to a combination of analog and digital circuits, and/or one or more processors configured with software and/or firmware, e.g., stored in memory, that, when executed by the one or more processors such as the processor 1009, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Those skilled in the art will also appreciate that any of the sending unit 1001, the setting unit 1002, the receiving unit 1003, the incrementing unit 1004, the repeating unit 1005, the initiating unit 1006, the adding unit 1007 and the saving unit 1008 described above may be the processor 1009 of the first network node 101, or an application running on such processor 1009.

Thus, the methods according to the embodiments described herein for the first network node 101 may be respectively implemented by means of a computer program 1013 product, comprising instructions, i.e., software code portions, which, when executed on at least one processor 1009, cause the at least one processor 1009 to carry out the actions described herein, as performed by the first network node 101. The computer program 1013 product may be stored on a computer-readable storage medium 1014. The computer-readable storage medium 1014, having stored thereon the computer program 1013, may comprise instructions which, when executed on at least one processor 1009, cause the at least one processor 1009 to carry out the actions described herein, as performed by the first network node 101. In some embodiments, the computer-readable storage medium 1014 may be a non-transitory computer-readable storage medium, such as a CD ROM disc, a memory stick, or stored in the cloud space. In other embodiments, the computer program 1013 product may be stored on a carrier containing the computer program, wherein the carrier is one of an electronic signal, optical signal, radio signal, or the computer-readable storage medium 1014, as described above.

The first network node 101 may comprise an interface unit to facilitate communications between the first network node 101 and other nodes or devices, e.g., the second network node 102. In some particular examples, the interface may, for example, include a transceiver configured to transmit and receive radio signals over an air interface in accordance with a suitable standard.

To perform the method actions described above in relation to FIG. 4, the second network node 102 may comprise the following arrangement depicted in FIG. 11. The second network node 102 is configured to trace the packet in the pipeline 107. The pipeline 107 is configured to be comprised in the second network node 102. The pipeline 107 is further configured to comprise the set of flow tables. The second network node 102 is further configured to operate in the SDN 10 using OpenFlow.

The detailed description of some of the following corresponds to the same references provided above, in relation to the actions described for the second network node 102, and will thus not be repeated here. For example, the packet may be a Traceroute packet. In another example, the second network node 102 may be configured to manage an OpenFlow switch.

The second network node 102 is configured to, e.g. by means of a receiving unit 1101 within the second network node 102 configured to, receive the first indication from the first network node 101 that is to send the packet, the packet being configured to comprise the trace bit, and the packet being configured to be provided with the TTL value. The first indication is configured to indicate, to the second network node 102, to have each flow table comprised in the set of flow tables decrement the TTL value by 1 based upon detection of the trace bit.

The second network node 102 is also configured to, e.g. by means of the receiving unit 1101 within the second network node 102 further configured to, receive the packet configured to comprise the trace bit and the TTL value from the first network node 101. The packet is configured to be provided to the first flow table, e.g., table 0, configured to be comprised in the set of flow tables, the set of flow tables having been configured to process the packet in the order.

The first time the packet is configured to be received, the TTL value is configured to be provided with packet is equal to 1.

In some embodiments, the second network node 102 may be configured to, e.g. by means of a processing unit 1102 within the second network node 102 configured to, process the packet according to the first indication configured to be received. To process is further configured to comprise to: i) send the packet to the first network node 101 once the TTL value is decreased to 0, and ii) send the packet to the next flow table in the set of flow tables, once the TTL value is decreased to a resulting value different than 0.

In some embodiments, the second network node 102 may be configured to, e.g. by means of a sending unit 1103 within the second network node 102 configured to, send the packet from another flow table in the set of flow tables to the first network node 101 once the TTL value is decreased to 0.

The second network node 102 is configured to, e.g. by means of a repeating unit 1104 within the second network node 102 configured to, for every remaining flow table in the set of flow tables, and for as long as there is at least one remaining flow table in the set of flow tables, following the order of the flow tables in the set of flow tables, and one flow table at a time, repeat the receiving of the packet, with the TTL value incremented by 1, the processing and the sending of the packet, until one of: i) the last flow table in the set of flow tables is reached, and ii) the criterion is met.

In some embodiments, wherein the pipeline 107 may be further configured to comprise the one or more group tables, and wherein the packet may be configured to be processed by the one or more group tables within the order of the flow tables in the set of flow tables, the second network node 102 may be further configured to, e.g. by means of the receiving unit 1101 within the second network node 102 configured to, receive, from the first network node 101, the action bucket for each one or more group tables. The group identifier may be configured to be pushed as a MPLS label to each packet in the one or more group tables. The action bucket may be configured to decrement the TTL value by 1 based upon detection of the trace bit in the packet. In such embodiments, the another flow table in the set of flow tables from which the packet is configured to be sent to the first network node 101 may be configured to be comprised in one of: the set of flow tables and the one or more group tables. Also in such embodiments, to process the packet may further comprise to process the packet according to the action bucket configured to be received for each one or more group tables. To process may be further configured to comprise to: i) send the packet to the first network node 101 once the TTL value is decreased to 0, and ii) send the packet to the next one of: a) flow table in the set of flow tables and b) group table in the pipeline 107, once the TTL value is decreased to a resulting value different than 0.

In some embodiments, wherein the pipeline 107 may be further configured to comprise the one or more group tables, and wherein the packet may be configured to be processed by the one or more group tables within the order of the flow tables in the set of flow tables, the second network node 102 may be further configured to, e.g. by means of the repeating unit 1104 within the second network node 102 further configured to, for every remaining flow table in the set of flow tables or group table in the pipeline 107, and for as long as there is at least one remaining: flow table in the set of flow tables or group table, following the order, and one flow table or group table at a time: repeat the receiving of the packet, with the TTL value configured to be incremented by 1, the processing and the sending of the packet, until one of: iii) the last flow table in the set of flow tables or group table is reached, and iv) the criterion is met.

The embodiments herein may be implemented through one or more processors, such as a processor 1105 in the second network node 102 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the second network node 102. One such carrier may be in the form of a CD ROM disc. It is however feasible with other data carriers such as a memory stick. The computer program code may furthermore be provided as pure program code on a server and downloaded to the second network node 102.

The second network node 102 may further comprise a memory 1106 comprising one or more memory units. The memory 1106 is arranged to be used to store obtained information, store data, configurations, schedulings, and applications etc. to perform the methods herein when being executed in the second network node 102.

In some embodiments, the second network node 102 may receive information from, e.g., the first network node 101, through a receiving port 1107. In some examples, the receiving port 1107 may be, for example, connected to one or more antennas in second network node 102. In other embodiments, the second network node 102 may receive information from another structure in the SDN 10 through the receiving port 1107. Since the receiving port 1107 may be in communication with the processor 1105, the receiving port 1107 may then send the received information to the processor 1105. The receiving port 1107 may also be configured to receive other information.

The processor 1105 in the second network node 102 may be further configured to transmit or send information to e.g., the first network node 101 or any of the one or more wireless devices 140, through a sending port 1108, which may be in communication with the processor 1105, and the memory 1106.

Those skilled in the art will also appreciate that the receiving unit 1101, the processing unit 1102, the sending unit 1103, and the repeating unit 1104 described above may refer to a combination of analog and digital circuits, and/or one or more processors configured with software and/or firmware, e.g., stored in memory, that, when executed by the one or more processors such as the processor 1105, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Those skilled in the art will also appreciate that any of the receiving unit 1101, the processing unit 1102, the sending unit 1103, and the repeating unit 1104, described above may be the processor 1105 of the second network node 102, or an application running on such processor 1105.

Thus, the methods according to the embodiments described herein for the second network node 102 may be respectively implemented by means of a computer program 1109 product, comprising instructions, i.e., software code portions, which, when executed on at least one processor 1105, cause the at least one processor 1105 to carry out the actions described herein, as performed by the second network node 102. The computer program 1109 product may be stored on a computer-readable storage medium 1110. The computer-readable storage medium 1110, having stored thereon the computer program 1109, may comprise instructions which, when executed on at least one processor 1105, cause the at least one processor 1105 to carry out the actions described herein, as performed by the second network node 102. In some embodiments, the computer-readable storage medium 1110 may be a non-transitory computer-readable storage medium, such as a CD ROM disc, a memory stick, or stored in the cloud space. In other embodiments, the computer program 1109 product may be stored on a carrier containing the computer program, wherein the carrier is one of an electronic signal, optical signal, radio signal, or the computer-readable storage medium 1110, as described above.

The second network node 102 may comprise an interface unit to facilitate communications between the second network node 102 and other nodes or devices, e.g., the first network node 101. In some particular examples, the interface may, for example, include a transceiver configured to transmit and receive radio signals over an air interface in accordance with a suitable standard.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a first network node for tracing a packet in a pipeline, the pipeline being comprised in a second network node, the pipeline comprising a set of flow tables and one or more group tables, the first network node and the second network node operating in a software defined network using OpenFlow, the method comprising:

sending a first indication to the second network node that is to receive the packet, the packet comprising a trace bit, and the packet to be provided with a Time To Live, TTL, value, the first indication instructing the second network node to have each flow table comprised in the set of flow tables decrement the TTL value by 1, based upon detection of the trace bit;

setting an initial value of the TTL value in the packet to be equal to 1;

sending the packet comprising the trace bit and the TTL value to the second network node, wherein the packet is provided to a first flow table (table 0) comprised in the set of flow tables, the set of flow tables processing the packet in an order and the one or more group tables processing the packet within the order of the flow tables in the set of flow tables;

adding an action bucket to each of the one or more group tables, wherein a group identifier is pushed as a Multiprotocol Label Switching label to each packet in each of the one or more group tables, and wherein the action bucket is to decrement the TTL value by 1, based upon detection of the trace bit in the packet;

receiving the packet, from one of another flow table in the set of flow tables and the one or more group tables, with the TTL value of 0, and for every remaining flow table in the set of flow tables and one or more group tables, and for as long as there is at least one remaining: flow table in the set of flow tables or group table, following the order, and one flow table or group table at a time:
  a) incrementing the TTL value by 1, and
  b) repeating the sending of the packet, and the receiving of the packet, until one of:
    i) a last flow table in the set of flow tables and last group table is reached, and ii) a criterion is met; and initiating sending, to a third network node, a second indication of a route followed by the packet in the pipeline, based on one of: iii) the packet having been received from all the flow tables in the set of flow tables and all of the one or more group tables, and iv) the criterion having been met, wherein the second indication is based on a saved identifier identifying flow tables and group tables from which the packet was received.

2. The method according to claim 1, wherein the packet is a Traceroute packet.

3. The method according to claim 1, wherein the second network node manages an OpenFlow switch.

4. The method according to claim 1, further comprising:
saving the identifier of at least one of: the flow table and the group table, from which the packet is received,
and wherein the repeating further comprises repeating the saving of the identifier.

5. A method performed by a second network node for tracing a packet in a pipeline, the pipeline being comprised in the second network node, the pipeline comprising a set of flow tables and one or more group tables, the second network node operating in a software defined network using OpenFlow, the method comprising:
receiving a first indication from a first network node that is to send the packet, the packet to comprise a trace bit, and the packet to be provided with a Time To Live (TTL) value, the first indication instructing the second network node to have each flow table comprised in the set of flow tables and each of the one or more group tables decrement the TTL value by 1 based upon detection of the trace bit;
receiving the packet comprising the trace bit and the TTL value from the first network node, wherein the packet is provided to a first flow table (table 0) comprised in the set of flow tables, the set of flow tables having been set to process the packet in an order and the one or more group tables having been set to process the packet within the order of the flow tables in the set of flow tables;

receiving, from the first network node, an action bucket for each one or more group tables, wherein a group identifier is pushed as a Multiprotocol Label Switching label to each packet in the one or more group tables, and wherein the action bucket is to decrement the TTL value by 1 based upon detection of the trace bit in the packet;

processing the packet according to the received first indication and for each of the one or more group tables, according to the received action bucket, and wherein the processing further comprises:
  i. sending the packet to the first network node once the TTL value is decreased to 0, and
  ii. sending the packet to a next one of: a) a next flow table in the set of flow tables and b) group table in the pipeline, once the TTL value is decreased to a resulting value different than 0; and sending the packet from one of: another flow table in the set of flow tables and the one or more group tables to the first network node once the TTL value is decreased to 0, wherein a first time the packet is received, the TTL value provided with packet is equal to 1, and wherein for every remaining flow table in the set of flow tables and group table in the pipeline, and for as long as there is at least one remaining: flow table in the set of flow tables or group table in the pipeline, following the order of the flow tables in the set of flow tables and one or more group tables, and one flow table or group table at a time:
  repeating the receiving of the packet, with the TTL value incremented by 1, the processing and the sending of the packet, until one of: i) a last flow table in the set of flow tables and group table in the pipeline is reached, and ii) a criterion is met.

6. The method according to claim 5, wherein the packet is a Traceroute packet.

7. The method according to claim 5, wherein the second network node manages an OpenFlow switch.

8. A first network node configured to trace a packet in a pipeline, the pipeline being configured to be comprised in a second network node, the pipeline being further configured to comprise a set of flow tables and one or more group tables, the first network node and the second network node being configured to operate in a software defined network using OpenFlow, the first network node comprising:
processing circuitry; and
memory coupled to the processing circuitry and having instructions stored therein that are executable by the processing circuitry to cause the first network node to perform operations, the operations comprising:
  sending a first indication to the second network node that is to receive the packet, the packet being configured to comprise a trace bit, and the packet being further configured to be provided with a Time To Live, TTL, value, the first indication being configured to instruct the second network node to have each flow table comprised in the set of flow tables decrement the TTL value by 1, based upon detection of the trace bit;
  setting an initial value of the TTL value in the packet to be equal to 1;
  sending the packet configured to comprise the trace bit and the TTL value to the second network node, wherein the packet is configured to be provided to a first flow table (table 0) configured to be comprised in the set of flow tables, the set of flow tables processing the packet in an order and the one or more group tables processing the packet within the order of the flow tables in the set of flow tables;

adding an action bucket to each of the one or more group tables, wherein a group identifier is pushed as a Multiprotocol Label Switching label to each packet in each of the one or more group tables, and wherein the action bucket is to decrement the TTL value by 1, based upon detection of the trace bit in the packet;

receiving the packet, from one of another flow table in the set of flow tables and the one or more group tables, with the TTL value of 0, and for every remaining flow table in the set of flow tables and the one or more group tables, and for as long as there is at least one remaining: flow table in the set of flow tables or group table, following the order, and one flow table or group table at a time:
  a) incrementing the TTL value by 1, and
  b) repeating the sending of the packet, and the receiving of the packet, until one of: i) a last flow table in the set of flow tables and last group table is reached and ii) a criterion is met; and initiating sending, to a third network node, a second indication of a route followed by the packet in the pipeline, based on one of: iii) the packet having been received from all the flow tables in the set of flow tables and all of the one or more group tables, and iv) the criterion having been met, wherein the second indication is based on a saved identifier identifying flow tables and group tables from which the packet was received.

9. The first network node according to claim 8, wherein the packet is a Traceroute packet.

10. The first network node according to claim 8, wherein the second network node is configured to manage an OpenFlow switch.

11. A second network node configured to trace a packet in a pipeline, the pipeline being configured to be comprised in the second network node, the pipeline being further configured to comprise a set of flow tables and one or more group tables, the second network node being further configured to operate in a software defined network using OpenFlow, the second network node comprising:

processing circuitry; and memory coupled to the processing circuitry and having instructions stored therein that are executable by the processing circuitry to cause the second network node to perform operations, the operations comprising:

receiving a first indication from a first network node that is to send the packet, the packet being configured to comprise a trace bit, and the packet being configured to be provided with a Time To Live, TTL, value, the first indication being configured to instruct the second network to have each flow table comprised in the set of flow tables and each of the one or more group tables decrement the TTL value by 1 based upon detection of the trace bit;

receiving the packet configured to comprise the trace bit and the TTL value from the first network node, wherein the packet is configured to be provided to a first flow table (table 0) configured to be comprised in the set of flow tables, the set of flow tables having been configured to process the packet in an order and the one or more group tables having been set to process the packet within the order of the flow tables in the set of flow tables;

receive, from the first network node, an action bucket for each one or more group tables, wherein a group identifier is pushed as a Multiprotocol Label Switching label to each packet in the one or more group tables, and wherein the action bucket is to decrement the TTL value by 1 based upon detection of the trace bit in the packet;

processing the packet according to the first indication and for each of the one or more group tables, according to the received action bucket, and wherein to process is further configured to comprise to:
  i. send the packet to the first network node once the TTL value is decreased to 0, and
  ii. send the packet to a next one of: a) flow table in the set of flow tables and b) group table in the pipeline, once the TTL value is decreased to a resulting value different than 0; and sending the packet from one of: another flow table in the set of flow tables and the one of more group tables to the first network node once the TTL value is decreased to 0;

wherein a first time the packet is configured to be received, the TTL value is configured to be provided with packet is equal to 1, and wherein for every remaining flow table in the set of flow tables and group table in the pipeline, and for as long as there is at least one remaining flow table in the set of flow tables or group table in the pipeline, following the order of the flow tables in the set of flow tables and one or more group tables, and one flow table or group table at a time:

repeat the receiving of the packet, with the TTL value incremented by 1, the processing and the sending of the packet, until one of: i) a last flow table in the set of flow tables and group table in the pipeline is reached, and ii) a criterion is met; and initiating sending, to a third network node, a second indication of a route followed by the packet in the pipeline, based on one of: iii) the packet having been received from all the flow tables in the set of flow tables, and iv) the criterion having been met, wherein the second indication is based on a saved identifier flow tables from which the packet was received.

12. The second network node according to claim 11, wherein the packet is a Traceroute packet.

13. The second network node according to claim 11, wherein the second network node is configured to manage an OpenFlow switch.

* * * * *